(12) United States Patent
Bennett et al.

(10) Patent No.: US 7,110,969 B1
(45) Date of Patent: Sep. 19, 2006

(54) METHODS AND SYSTEMS FOR ELECTRONIC ORDER ROUTING (CORS)

(75) Inventors: Deborah A. Bennett, New York, NY (US); Neil D. Potter, Westfield, NJ (US); Peter E. Rayner, Esher (GB); David Schreier, Verona, NJ (US); Fred Irwin, Frankfurt (DE)

(73) Assignee: Crossmar, Inc., New York, NY (US)

( * ) Notice: Subject to any disclaimer, the term of this patent is extended or adjusted under 35 U.S.C. 154(b) by 727 days.

(21) Appl. No.: 09/626,205

(22) Filed: Jul. 26, 2000

Related U.S. Application Data

(60) Provisional application No. 60/180,288, filed on Feb. 4, 2000, provisional application No. 60/146,523, filed on Jul. 30, 1999.

(51) Int. Cl.
*G06Q 40/00* (2006.01)

(52) U.S. Cl. .......................................... 705/35; 705/37
(58) Field of Classification Search ................. 705/35, 705/37
See application file for complete search history.

(56) References Cited

U.S. PATENT DOCUMENTS

| | | | | |
|---|---|---|---|---|
| 5,517,406 | A | 5/1996 | Harris et al. ................. | 364/408 |
| 5,774,553 | A * | 6/1998 | Rosen .......................... | 385/49 |
| 5,787,402 | A | 7/1998 | Potter et al. .................. | 705/37 |
| 5,864,827 | A | 1/1999 | Wilson ......................... | 705/35 |
| 5,893,079 | A | 4/1999 | Cwenar ........................ | 705/36 |
| 5,918,218 | A | 6/1999 | Harris et al. .................. | 705/37 |
| 5,991,739 | A | 11/1999 | Cupps et al. .................. | 705/26 |
| 6,226,623 | B1 * | 5/2001 | Schein ......................... | 705/35 |
| 6,278,982 | B1 * | 8/2001 | Korhammer .................. | 705/37 |
| 6,347,307 | B1 * | 2/2002 | Sandhu ......................... | 705/35 |
| 6,370,516 | B1 * | 4/2002 | Reese ........................... | 705/36 |

(Continued)

OTHER PUBLICATIONS

"The Image Is The Message," *1990 Computer Systems News*, 1990, (p. 8 of enclosure).

(Continued)

*Primary Examiner*—Alain L. Bashore
(74) *Attorney, Agent, or Firm*—George T. Marcou; Kilpatrick Stockton LLP

(57) ABSTRACT

The present invention provides automated methods and systems for electronic order routing, and, more particularly, for selecting, ordering, routing, confirming, and tracking orders for financial instruments, such as mutual funds, among multiple buyers and sellers. More specifically, the present invention provides end-to-end, straight-through-transaction processing methods and systems for multiple financial instruments combining order routing, execution, settlement, foreign exchange, and custodial services to financial service providers with a retail customer base. Further, the methods and systems may be utilized to perform one or more of the following tasks: (1) monitor the real-time status of a financial order at various stages; (2) accommodate additional financial instruments and additional users as the system expands; (3) facilitate lower transaction and processing costs; (4) provide multilingual capabilities, settlement currencies, and other identifiers necessary to quote and execute an order for a financial instrument; (5) minimize the manual entry and re-keying of information into multiple formats and templates used by brokers, fund managers, and other parties to a financial transaction.

The system components may include a plurality of client terminals running an interactive user interface, a network server, and at least one communications network. In other possible embodiments of the present invention, the methods and systems: (1) provide an archive capability for storing transactional data, including order data; (2) provide detailed reports; (3) provide integration with external and internal systems; (4) utilize state-of-the-art technology; and/or (5) allow for real-time system configuration and modifications.

34 Claims, 40 Drawing Sheets

U.S. PATENT DOCUMENTS 6,408,282 B1 * 6/2002 Buist .......................... 705/37

OTHER PUBLICATIONS

"Tech Bytes: 100 Japanese Banks Using Prologic Fund System," *American Banker*, Feb. 4, 1999, (p. 22 of enclosure).

"Mutual Fund Co. Becomes First to Offer Web Sales," *Investment Dealers' Digest*, Sep. 30, 1996, (p. 23 of enclosure).

"E* Trade Again Rated #1 Place To Invest Online," *PR Newswire*, Jun. 3, 1999, (p. 25 of enclosure).

"Schwab Institutional To Rollout Y2K And Web-Integrated Software in June," *PR Newswire*, May 5, 1999, (p. 28 of enclosure).

"Online Brokerage Is A "Must" Service," *Retail Delivery Systems News*, Dec. 5, 1997 (p. 31 of enclosure).

"i/money Website Celebrates 100,000 Registered Users," *Canada Newswire*, Feb. 9, 1999, (p. 43 of enclosure).

"Wachovia (WB) Expands Automated Securities Trading Service," *Bridge News*, Aug. 5, 1997, (p. 48 of enclosure).

"Unified Management Built Its Business Around First Automated Mutual Fund," *American Banker*, Aug. 17, 1984, (p. 49 of enclosure).

"Depository Trust Co Prepares To Link Bank Trust Departments To Mutual Fund Processing," *The Bond Buyer*, Mar. 6, 1989, (p. 54 of enclosure).

"Enabling Retail Cross-Border Order Flow," *The Euromoney Foreign Exchange and Treasury Management Handbook*, 2000.

* cited by examiner

Broker User Module - Transaction

CrossMar Mutual Funds    Broker

File View Options Maintenance Reports Windows Help

| FundManage | FundName | ISIN_GC | Currency | Initial | Redemption | NAV | Bid | Offer | PricingDate |
|---|---|---|---|---|---|---|---|---|---|
| FundMgrAB | Japanese Smaller Companies | LU0051759568 | USD | 5.000 | 1.000% | 175.000 | 11.200 | 11.860 | 31/12/1998 |

Book Shares
○ Nominee ⊙ Client

Basis
⊙ Shares ○ Cash ○ Percentage

Number Of Shares
8,000

Book Shares
⊙ Standard ○ Non Standard

Account: D-003330

Transaction Type: Redemption

○ Full ⊙ Partial

Settlement CCY: USD

Dealing Terms: Standard

Client: Client48

Order Status:

[Save Layout] [Submit] [Exit]

FIG. 10B

Broker User Module - Sample of Fund Pricing with Selection of Fund, "Jump" to Transaction Screen

CrossMar Mutual Funds - Place Order     User: VES

| Fund Manager | Fund Name | Fund ID | CCY | Initial | NAV | Bid | Offer | Price Date |
|---|---|---|---|---|---|---|---|---|
| Fidelity | Euro Blue Chip Fd | 971525 | EUR | 0.0525 | 12.040 | 12.040 | 12.672 | 18-Mar-99 |

Book Shares
⦿ Nominee  ○ Client

Basis
⦿ Shares  ○ Cash

Number of Shares
[        ]

Settlement
⦿ Standard  ○ Non standard

Account
[        ▽]

Transaction Type
[Purchase ▽]

Settlement CCY
[EUR ▽]

Dealing Terms
[Standard ▽]

Transaction Reference
[                ]

Order Status
[Pending         ]

[Exit] [Allocate] [Submit] [Next] [Previous]

*FIG. 11*

Broker User Module - Sample of Purchase Transaction (for shares, standard settlement)

CrossMar Mutual Funds - Place Order    User: VES

| Fund Manager | Fund Name | Fund ID | CCY | Initial | NAV | Bid | Offer | Price Date |
|---|---|---|---|---|---|---|---|---|
| Fidelity | Euro Blue Chip Fd | 971525 | EUR | 0.0525 | 12.040 | 12.040 | 12.672 | 18-Mar-99 |

Book Shares
● Nominee  ○ Client

Basis
● Shares  ○ Cash

Settlement
● Standard  ○ Non standard

Account [ ▽ ]

Number of Shares [ ]

Settlement CCY [ EUR ▽ ]

Transaction Type
[ Purchase ▽ ]

Dealing Terms
[ Standard ▽ ]

Transaction Reference [ ]

Order Status [ Pending ]

[ Exit ]   [ Allocate ]   [ Submit ]   [ Next ]   [ Previous ]

*FIG. 12*

Broker User Module - Sample of Purchase Transaction (for cash, standard settlement)

CrossMar Mutual Funds - Place Order    User: VES

| Fund Manager | Fund Name | Fund ID | CCY | Initial | NAV | Bid | Offer | Price Date |
|---|---|---|---|---|---|---|---|---|
| Fidelity | Euro Blue Chip Fd | 971525 | EUR | 0.0525 | 12.040 | 12.040 | 12.672 | 18-Mar-99 |

Book Shares
◉ Nominee  ○ Client

Basis
○ Shares  ◉ Cash

Cash amount [ ]

Settlement
○ Standard  ◉ Non standard

Account [ ▼ ]

Transaction CCY [ EUR ▼ ]

Rounding [ ▼ ]

Settlement CCY [ EUR ▼ ]

Dealing Terms [ Standard ▼ ]

Transaction Type [ Purchase ▼ ]

NS Instructions
Bank [ ]
City [ ]
Account ID [ ]

Transaction Reference [ ]

Order Status [ Pending ]

[ Exit ]  [ Allocate ]  [ Submit ]  [ Next ]  [ Previous ]

*FIG. 13*

Broker User Module - Sample of Purchase Transaction (for cash, non-standard settlement)

CrossMar Mutual Funds - Place Order    User: VES

| Fund Manager | Fund Name | Fund ID | CCY | Initial | NAV | Bid | Offer | Price Date |
|---|---|---|---|---|---|---|---|---|
| Fidelity | Euro Blue Chip Fd | 971525 | EUR | 0.0525 | 12.040 | 12.040 | 12.672 | 18-Mar-99 |

Book Shares
○ Nominee  ⦿ Client

Basis
○ Shares  ⦿ Cash

Cash amount
[          ]

Settlement
○ Standard  ⦿ Non standard

Account
[        ▾]

Transaction CCY
[EUR    ▾]

Rounding
[        ▾]

Settlement CCY
[EUR    ▾]

Dealing Terms
[Standard ▾]

Transaction Type
[Redemption ▾]

○ Full  ⦿ Partial

NS Instructions
Bank  [          ]
City  [          ]
Account ID  [          ]

Transaction Reference
[                    ]

Order Status
[Pending]

[Exit]  [Allocate]  [Submit]  [Next]  [Previous]

*FIG. 14*

Broker User Module - Sample of a Full Redemption

CrossMar Mutual Funds - Place Order    User: VES

| Fund Manager | Fund Name | Fund ID | CCY | Initial | NAV | Bid | Offer | Price Date |
|---|---|---|---|---|---|---|---|---|
| Fidelity | Asian Special Situations | 974004 | USD | 0.0525 | 6.049 | 6.049 | 6.367 | 22-Mar-99 |

Book Shares
- ⊙ Nominee  ○ Client

Basis
- ⊙ Shares  ○ Cash

Settlement
- ⊙ Standard  ○ Non standard

Account: FIDVESJOM001 ▽

Number of Shares: 1000

Settlement CCY: EUR ▽

Dealing Terms: Standard ▽

Transaction Type: Purchase ▽

Allocations

| ClientId | AccountId | Allocation |
|---|---|---|
| VESBRM | VESBRM001 | 200 |
| VESJOM | VESJOM001 | 800 |

Transaction Reference:

Order Status: Pending

[Save Layout] [Exit] [Allocate] [Submit] [Next] [Previous]

FIG. 15

Broker User Module - Sample Screen of a Partial Redemption (for Cash)

| CrossMar Mutual Funds - Place Order | | User: VES | | | | | |
|---|---|---|---|---|---|---|---|
| Fund Manager | Fund Name | Fund ID | CCY | Initial | NAV | Bid | Offer | Price Date |
| Fidelity | Euro Blue Chip Fd | 971525 | EUR | 0.0525 | 12.040 | 12.040 | 12.672 | 18-Mar-99 |

Book Shares
○ Nominee  ● Client

Basis
○ Shares  ● Cash

Cash amount
[        ]

Settlement
○ Standard  ● Non standard

Account
[         ▼]

Transaction CCY
[EUR ▼]

Rounding
[       ▼]

Settlement CCY
[EUR ▼]

Bank
City
Account ID

Dealing Terms
[Standard ▼]

Transaction Type
[Redemption ▼]

○ Full  ● Partial

NS Instructions

Transaction Reference

Order Status
[Pending]

[Exit]  [Allocate]  [Submit]  [Next]  [Previous]

*FIG. 16*

Broker User Module - Full Switch Transaction

CrossMar Mutual Funds - Place Order    User: VES

| Fund Manager | Fund Name | Fund ID | CCY | Initial | NAV | Bid | Offer | Price Date | |
|---|---|---|---|---|---|---|---|---|---|
| Fidelity | America | 971522 | USD | 0.0525 | 4.099 | 4.099 | 4.314 | 18-Mar-99 | Buy |
| Fidelity | Japan | 971532 | JPY | 0.0525 | 121.600 | 121.600 | 127.984 | 18-Mar-99 | Sell |

Book Shares
○ Nominee  ○ Client

Account [ ▽ ]

Basis
○ Shares  ⊙ ¦Cash¦

Cash Amount [           ]

Transaction CCY
[ EUR  ▽ ]

Rounding [ ▽ ]

Transaction Type
[ Switch  ▽ ]

○ Full  ⊙ Partial

Transaction Reference [           ]

Order Status [ Pending ]

[ Exit ]  [ Allocate ]  [ Submit ]  [ Next ]  [ Previous ]

FIG. 17

Broker User Module - Partial Switch Transaction (Cash)

| CrossMar Mutual Funds - Place Order | | User: VES | | | | | | |
|---|---|---|---|---|---|---|---|---|
| Fund Manager | Fund Name | Fund ID | CCY | Initial | NAV | Bid | Offer | Price Date |
| Fidelity | America | 971522 | USD | 0.0525 | 4.099 | 4.099 | 4.314 | 18-Mar-99 | Buy
| Fidelity | Japan | 971532 | JPY | 0.0525 | 121.600 | 121.600 | 127.984 | 18-Mar-99 | Sell Book Shares
- ⊙ Nominee  ○ Client Account [▽]

Basis
- ○ Shares  ⊙ Cash

Cash Amount [        ]

Transaction CCY
[EUR ▽]

Rounding [▽]

Transaction Type
[Switch ▽]

○ Full  ⊙ Partial

Transaction Reference [        ]

Order Status [Pending]

[Exit]  [Allocate]  [Submit]  [Next]  [Previous]

FIG. 18

Broker User Module - Sample View Order

CrossMar Mutual Funds System  User: VES

File  View  Options  Reports  Window  Help

CrossMar Mutual Funds - View Orders  User: VES

31 Orders

| FMID | OrderRef | OrderDate | FundName | FundID | Status | Type | FMref |
|------|----------|-----------|----------|--------|--------|------|-------|
| Fidelity | VESFIDVESBRM00100 | 01-Mar-1999 08:58 | Emerging Markets | 972998 | Filled | Purchase | Fidelity0016 |
| Fidelity | VESFIDVESBRM00100 | 01-Mar-1999 09:05 | Euro Blue Chip Fd | 971525 | Filled | Switch | Fidelity0017 |
| Fidelity | VESFIDVESBRM00100 | 01-Mar-1999 09:07 | Asian Special Situations | 974004 | Filled | Redemption | Fidelity0018 |
| Fidelity | VESFIDVESBRM00100 | 01-Mar-1999 09:13 | America | 971522 | Filled | Purchase | Fidelity0019 |
| Fidelity | VESFIDVESBRM00100 | 01-Mar-1999 10:08 | Asian Special Situations | 974004 | Filled | Purchase | Fidelity0020 |
| Fidelity | VESFIDVESBRM00100 | 01-Mar-1999 10:14 | Emerging Markets | 972998 | Filled | Switch | Fidelity0021 |
| Fidelity | VESFIDVESBRM00100 | 01-Mar-1999 10:16 | Euro Blue Chip Fd | 971525 | Filled | Redemption | Fidelity0022 |
| Fidelity | VESFIDVESBRM00100 | 19-Mar-1999 09:35 | Euro Balanced | 973810 | Filled | Purchase | Fidelity0023 |
| Fidelity | VESFIDVESJOM001000 | 19-Mar-1999 10:13 | Euro Balanced | 973810 | Filled | Purchase | Fidelity0024 |
| Fidelity | VESFIDVESBRM00100 | 19-Mar-1999 10:59 | Euro Blue Chip Fd | 971525 | ReceivedFM | Purchase | |
| Fidelity | VESFIDVESJOM001000 | 19-Mar-1999 10:59 | Euro Balanced | 973810 | ReceivedFM | Purchase | |
| Fidelity | VESFIDVESJOM001000 | 19-Mar-1999 11:00 | Fidelity Gestion | | Pending | Purchase | |
| Fidelity | VESFIDVESJOM001000 | 19-Mar-1999 11:01 | Fidelity Pfl Selector Glb | | Pending | Purchase | |
| Fidelity | VESFIDVESBRM00100 | 19-Mar-1999 11:01 | Fidelity Premium Pfl | | | Purchase | |

Fund Manager     Fund Name     Fund ID     Status     OrderDate

☐ Exact Search     [SaveLayout]     [Search]     [Clear]     [Exit]     [Trade Cancel]

Broker User Module - Sample of Error Message

Broker User Module - Sample of Error Message

An error message in the CORS Transaction Window. The user entered "one thousand" in the "Number of Shares" field and then clicked "Submit."

Broker User Module - Sample of Error Message

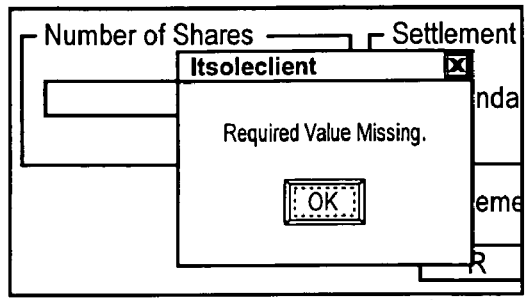

An error message in the CORS Transaction Window. The user neglected to enter a value in the "Number of Shares" field before clicking "Submit."

*FIG. 20C*

Broker User Module - Sample of Error Message

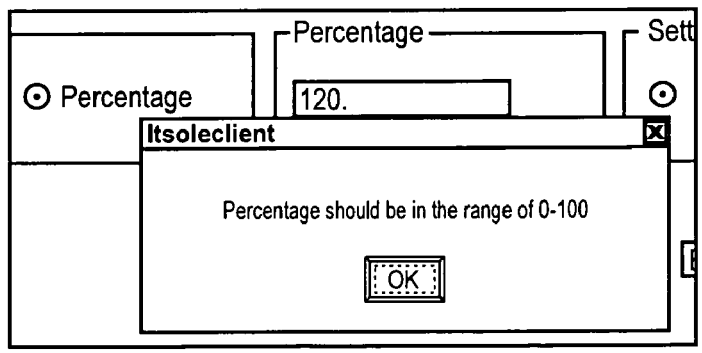

An error message in the CORS Transaction Window. The user entered a percentage greater than 100% in the "Percentage" field and clicked "Submit."

*FIG. 20D*

Broker User Module - Sample Order Confirmation Message

Broker User Module - Sample Order Confirmation Message

CORS message indicating that an account has been added successfully

Broker User Module - Sample Order Confirmation Message

CORS message indicating that an account has been updated successfully

Broker User Module - Sample Order Confirmation Message

CORS message indicating that an account has been successfully deleted

Broker User Module - View Orders

CrossMar Mutual Funds System  User: FIDELITY
File  View  Options  Reports  Window  Help CrossMar Mutual Funds - View Orders  User: FIDELITY 30 orders

| BKID | OrderRef | OrderDate | FundName | FundID | Status | Type | FMref | Price |
|------|----------|-----------|----------|--------|--------|------|-------|-------|
| VES | VESFIDVESBRM00100 | 28-Feb-1999 15:45 | ASEAN | 971523 | Pending | Switch | | |
| VES | VESFIDVESBRM00100 | 28-Feb-1999 15:53 | Australia | 972152 | Pending | Redemption | | |
| VES | VESFIDVESBRM00100 | 28-Feb-1999 15:54 | Euro Balanced | 973810 | Pending | Switch | | |
| VES | VESFIDVESBRM00100 | 01-Mar-1999 08:42 | Fidelity Gestion | | Pending | Purchase | | |
| VES | VESFIDVESJOM001000 | 01-Mar-1999 08:44 | Asian Special Situations | 974004 | Pending | Purchase | | |
| VES | VESFIDVESBRM00100 | 01-Mar-1999 08:45 | Australia | 972152 | Pending | Purchase | | |
| VES | VESFIDVESBRM00100 | 01-Mar-1999 08:58 | Emerging Markets | 972998 | Pending | Purchase | | |
| VES | VESFIDVESBRM00100 | 01-Mar-1999 09:05 | Euro Blue Chip Fd | 971525 | Pending | Switch | | |
| VES | VESFIDVESBRM00100 | 01-Mar-1999 09:07 | Asian Special Situations | 974004 | Pending | Redemption | | |
| VES | VESFIDVESBRM00100 | 01-Mar-1999 09:13 | America | 971522 | Pending | Purchase | | |
| VES | VESFIDVESBRM00100 | 01-Mar-1999 10:08 | Asian Special Situations | 974004 | Pending | Purchase | | |
| VES | VESFIDVESBRM00100 | 01-Mar-1999 10:14 | Emerging Markets | 972998 | Pending | Switch | | |
| VES | VESFIDVESBRM00100 | 01-Mar-1999 10:16 | Euro Blue Chip Fd | 971525 | Pending | Redemption | | |
| VES | VESFIDVESJOM001000 | 19-Mar-1999 09:35 | Euro Balanced | 973810 | Pending | Purchase | | |
| VES | VESFIDVESJOM001000 | 19-Mar-1999 10:13 | Euro Balanced | 973810 | Pending | Purchase | | |
| VES | VESFIDVESBRM00100 | 19-Mar-1999 10:59 | Euro Blue Chip Fd | 971525 | Pending | Purchase | | |

Broker  Fund Name  Fund ID  Status  Order Date

☐ Exact Search

[SaveLayout]  [Search]  [Clear]  [Exit]  [Upload]  [Download]

*FIG. 23*

Broker User Module - Set Defaults

User Defaults

Share Type
- ⦿ Global Certificate:
- ○ Registered Shares

Book Shares
- ⦿ Nominee
- ○ Client

Settlement
- ⦿ Standard
- ○ Non Standard

Fund Type
- ⦿ ISIN
- ○ CEDEL
- ○ LOCAL

Basis
- ⦿ Shares
- ○ Cash
- ○ Percentage

Deal Terms
[Standard ▾]

Rounding
[Up ▾]

Currency

Transaction Currency
[USD ▾]

Settlement Currency
[EUR ▾]

[OK] [Cancel] [Apply]

*FIG. 25*

Broker User Module - Add Clients

| Clients | | |
|---|---|---|
| ClientName ▽ | ClientID | BKID |
| ▷ Mary Bryant | VESBRM | VES |
| Jones Mark | VESJOM | VES |
| XYZ Client | VESXYZ | VES |

[Save Layout] [Add] [Delete] [Upload] [Exit]

CrossMar Mutual Funds - Add Client   User:VES

*FIG. 26*

Fund Manager User Module - View Rates

CrossMar Mutual Funds System   User: VES
File  View  Options  Reports  Window  Help CrossMar Mutual Funds - View Rates   User: VES 314 funds

| FundManage | FundName | FundID | ccy | Initial | NAV | Bid | Offer | Date |
|---|---|---|---|---|---|---|---|---|
| Fidelity | America | 971522 | USD | 0.0525 | 4.099 | 4.099 | 4.314 | 18-Mar-99 |
| Fidelity | American Growth Inc | 907046 | USD | 0.0525 | 15.160 | 15.160 | 15.956 | 18-Mar-99 |
| Fidelity | ASEAN | 971523 | USD | 0.0525 | 7.139 | 7.139 | 7.514 | 18-Mar-99 |
| Fidelity | Asian Special Situations | 974004 | USD | 0.0525 | 6.049 | 6.049 | 6.367 | 18-Mar-99 |
| Fidelity | Australia | 972152 | AUD | 0.0525 | 21.310 | 21.310 | 22.429 | 18-Mar-99 |
| Fidelity | Emerging Markets | 972998 | USD | 0.0525 | 5.449 | 5.449 | 5.735 | 18-Mar-99 |
| Fidelity | Euro Balanced | 973810 | EUR | 0.0525 | 10.370 | 10.370 | 10.914 | 18-Mar-99 |
| Fidelity | Euro Blue Chip Fd | 971525 | EUR | 0.0525 | 12.040 | 12.040 | 12.672 | 18-Mar-99 |
| Fidelity | European | 988524 | EUR | 0.0525 | 12.080 | 12.080 | 12.714 | 18-Mar-99 |
| Fidelity | European Growth | 999131 | EUR | 0.0525 | 4.674 | 4.674 | 4.919 | 18-Mar-99 |
| Fidelity | European Sm Cos F | 974608 | EUR | 0.0525 | 11.360 | 11.360 | 11.956 | 18-Mar-99 |
| Fidelity | Fid Premium Pflo Serv | | GBP | 0.0000 | 1.114 | 1.114 | 1.172 | 18-Mar-99 |
| Fidelity | Fidelity Gestion | | EUR | 0.0000 | 9.029 | 9.029 | 9.503 | 18-Mar-99 |
| Fidelity | Fidelity Gestion | | EUR | 0.0000 | 8.644 | 8.644 | 9.098 | 18-Mar-99 |
| Fidelity | Fidelity Pfl Selector Glb | | USD | 0.0000 | 12.080 | 12.080 | 12.714 | 18-Mar-99 |
| Fidelity | Fidelity Premium Pfl | | USD | 0.0000 | 11.930 | 11.930 | 12.556 | 18-Mar-99 |
| Fidelity | France | 971526 | EUR | 0.0525 | 23.330 | 23.330 | 24.555 | 18-Mar-99 |

Fund Manager        Fund Name         Fund ID         Currency

☐ Exact Search      SaveLayout        Search          Clear          Exit

*FIG. 28A*

Fund Manager User Module - View Rates

CrossMar Mutual Funds System — FundManager - [View Rates]

File  View  Options  Maintenance  Reports  Windows  Help

| | Fund Name | Curre. | Bid Price | Offer | Price | NAV | Zwisch | Yield | Divid. | Perf |
|---|---|---|---|---|---|---|---|---|---|---|
| 1 | Fund Prices & Information for : | | 16/07/99 | | | | | | | |
| 2 | | | | | | | | | | |
| 3 | | Cmcy | Bid Price | Offer Price | Price Move | NAV Per Share | Zwisch gewinn | Yield | Divid. Rate | Perfo YTD |
| 4 | Fund Name | | | | | | | | | |
| 5 | | | | | | | | | | |
| 6 | American | USD | 88.700 | 93.850 | 0.940 | 1530.500 | | | | |
| 7 | American Blue Chip | USD | 10.780 | 11.400 | 0.090 | 10.400 | | | | |
| 8 | American Fledgeling | USD | 95.010 | 100.520 | 0.630 | 300.000 | | | | |
| 9 | The New Fund | USD | 88.170 | 92.580 | 0.790 | 917.790 | | | | |
| 10 | Asian Opportunities | USD | 20.870 | 22.080 | -0.190 | 263.200 | | | | |
| 11 | Balanced | EUR | 7.200 | 7.630 | 0.000 | 28.800 | 0.110 | | | |
| 12 | China | USD | 12.060 | 12.760 | -0.290 | 219.300 | | | | |
| 13 | Eastern European | EUR | 14.460 | 15.300 | -0.080 | 331.100 | | | | |
| 14 | Emerging European | USD | 12.870 | 13.620 | -0.070 | 65.000 | | | | |
| 15 | Emerging Markets | USD | 9.560 | 10.120 | 0.030 | 111.000 | | | | |
| 16 | Emerging Markets Debt | USD | 11.910 | 12.350 | -0.010 | 49.700 | 1.300 | | | |
| 17 | Euro Bond | EUR | 5.990 | 6.210 | -0.030 | 123.500 | 0.250 | 0.037 | | |
| 18 | Euro Equity | EUR | 35.400 | 37.460 | 0.010 | 266.000 | | | | |
| 19 | European | EUR | 33.380 | 35.320 | 0.070 | 242.400 | | | | |
| 20 | European High Yield Bond | EUR | 5.280 | 5.480 | -0.020 | 72.800 | 0.520 | | | |

☐ Error   ☐ New Fund

No Errors Detected

[Import] [Parse] [Accept]  [Get Rates]  [Clear]  [Exit]

*FIG. 28B*

| | A | B | C | D | E | F | G | H | I | J | K | L |
|---|---|---|---|---|---|---|---|---|---|---|---|---|
| 1 | Order ID | Fund | Fund | Broker | Client ID | Account | Order | Switch ID | Order | Order | Terms | |
| 2 | 1999071 | LU0053685 | ABC | BrokerABC | | k-2455 | Redeem | 0 | 19/07/1999 | Filled | Cash | 1 |
| 3 | 1999071 | LU0053685 | ABC | BrokerABC | | k-2455 | Purchase | 0 | 19/07/1999 | Filled | Cash | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |

Exporting order information to a user's local computer. The user must name the file and choose a location in which to store it.

List of Database Fields in the "View Order" User Modules

| # | Field | Description | Always Present? | Sample Value |
|---|---|---|---|---|
| 1 | Order ID | Order Transaction Reference number | Yes | ABC19990713100 |
| 2 | Fund Code | CEDEL, ISIN, or local code for fund | Yes | LU0072845869 |
| 3 | Fund Name | Fund name | Yes | XYZ Emerging Markets |
| 4 | Broker Name | Broker Identifier | Yes | BBBrokerage |
| 5 | Client ID | Client Identifier if client level order (Fund Manager's ID, not CrossMar's) | Yes, if 6=client acct. | Client48 |
| 6 | Account No | Broker Account number (nominee or client) | Yes | j2756 |
| 7 | Order Type | Purchase, Redeem, Switch Purchase, Switch Redeem | Yes | Purchase |
| 8 | Switch ID | Switch reference number, a unique numeric identifier linking the two sides of a switch. | Yes, if 7=Switch | 3 |
| 9 | Order Date | Date the order was placed. After the daily cutoff time, new orders are dated as the next day. | N/A | July 7, 1999 12:00:00 |
| 10 | Order State | Pending, ReceivedFM, Cancel, ReceivedFM Cancel, Filled, Rejected, or Wait (only "Wait is manually input). | Yes | Pending |
| 11 | Terms | Shares, Cash, Percentage | Yes | Cash |
| 12 | Cash Amount | Amount of cash, if cash terms | Yes, if 11=Cash | 150000 |
| 13 | Transaction Currency | Currency of cash, if cash terms | Yes, if 11=Cash | EUR |
| 14 | Settlement Currency | Currency of settlement | Yes | USD |
| 15 | Rounding | Up, Down, or Full-Fraction | Yes, if 11=Cash | Down |
| 16 | Percentage | Percentage of holdings, if percentage terms (!) | Yes, if 11=Percentage | 57 |
| 17 | No of Shares | Number of shares, if share terms | Yes, if 11=Shares | 1800 |
| 18 | Settlement Type | Standard / Non-standard | Yes | Standard |
| 19 | Bank | Bank name, if non-standard settlement | Yes, if 18=Non-standard | Bob's Big Bank |
| 20 | City | City name, if non-standard settlement | Optional | Metropolis |
| 21 | Account | Bank account number, if non-standard settlement | Yes, if 18=Nonstandard | 154562268 |
| 22 | Swift | Swift code, if non-standard settlement | Optional | 87654321 |
| 23 | Dealing Terms | Standard/Reinv/Special Promotion | Yes | Standard |
| 24 | Reinv est Comm | All, 1%, or 2% | Yes, if 23=Reinvest | 2% |
| 25.* | FM Ref | Fund Manager Reference Number (optional) | Optional | 1234568 |
| 26.* | NAV | Net asset value per share in fund currency | Yes | 124 |
| 27.* | Total Funds | Total funds due/to be received in settlement currency per field 14 | Yes | 10000 |
| 28.* | Total Shares | Total number of shares to be purchased or redeemed | Yes | 1776 |
| 29.* | FX Rate | Foreign exchange rate used to convert settlement amount based in fund currency to settlement currency | Optional | 1.35 |
| 30.* | Zwischengewinn | Re- invested interest rate of the fund since its inception | Optional | 0.11 |
| 31.* | Value Date | Date funds available, if applicable | Yes | 13.10.1999 |
| 32. | Execution Date | | Yes | 13.10.1999 |
| 33. | Execution Time | Date uploaded into CORS / Time uploaded into CORS | Yes | 17:34:49 |
| 34.* | Execution Price | Broker's price per share in fund currency | Yes | 121.000 |
| 35.* | Commission | Commission due to the broker (optional) | Optional | 0 |
| 36.* | Rejection Reason | Reason for rejecting, if rejected. Often: unrecognized account number, redemption is greater than holding, or insufficient funds | Yes, if 10=Rejected | Insufficient funds |
| 37. | Date Priced | Date of pricing information | Yes | 13.10.1999 |
| 38. | Time Priced | Time of pricing information | Yes | 17:29:36 |
| 39. | Entry Time | Date/time order entered | Yes | 13.07.99 17:29:36 |
| 40. | Enterer | User who entered the order | Yes | CORXYZ |
| 41. | Accepted Time | Date/time order received by Fund Manager | Yes | 13.07.99 17:34:49 |
| 42. | Accepter | User who received the order | Yes | CORALK |
| 43. | Cancel Time | Date/time order cancelled | Yes | 15.07.99 16:07:26 |
| 44. | Canceller | User who cancelled the order | Yes | CORS VK |

* Indicates item will be filled in by the Fund Manager upon confirmation or rejection of the order.

Fig 32

METHODS AND SYSTEMS FOR ELECTRONIC ORDER ROUTING (CORS)

PRIORITY APPLICATIONS

This application claims the benefit of U.S. Provisional Application No. 60/146,523 filed Jul. 30, 1999, entitled "System And Method For Electronic Order Routing (CORS)," and is incorporated herein by reference.

This application also claims the benefit of U.S. Provisional Application No. 60/180,288 filed on Feb. 4, 2000, entitled "System And Method For Electronic Order Routing (CORS)," and is incorporated herein by reference.

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

The present invention relates generally to the field of electronic order routing that allows a user to select, order, route, confirm, and track orders for multiple financial instruments among multiple buyers and sellers (e.g., fund managers, brokers, custodians, etc.). More specifically, the present invention provides end-to-end, straight-through-transaction processing methods and systems for multiple financial instruments combining order routing, execution, settlement, foreign exchange, and custodial services to multiple parties to a financial transaction.

2. Background

Historically, many fund managers, for example, in Europe, sell mutual funds to and distribute those funds through brokers. As used herein, the term "fund managers" is used to represent mutual fund managers, executing brokers, fund house agents, transfer agents, and other financial service providers with a retail customer base. As used herein, the term "brokers" is used to represent mutual fund brokers, discount brokers, retail brokers, financial institutions, and other intermediaries that act as agents/brokers on behalf of retail clients. A broker may deal with many fund managers, and a fund manager may deal with many brokers. Currently, each separate broker makes up its own template for sending out orders, and they get back many different sorts of templates from the fund manager in terms of what the confirmation information looks like. That situation makes orders and confirmations difficult to interpret, and often results in mistakes. The situation is exacerbated when the broker and the fund manager are located in different countries, and, therefore, dealing in different languages and currencies.

Lacking efficient access to foreign markets, brokers attempting to procure financial products generally employ processes that are highly manual with significant risk of errors and risk of orders getting lost. For example, in order to fill a cross-border equity or a fixed income order, a broker must first establish a relationship with an fund manager in the desired market. After receiving an order, the broker transcribes the order information collected from its call center, customer fax, or web site onto an order ticket. The order ticket will then need to be routed to a fund manager in the foreign market for execution. The system used for the order routing may vary by fund manager and market and many times is simply transmitted as a fax. The broker then receives a notice of execution (again, most likely a fax) that needs to be matched back to the original order. The instructions associated with the trade are subsequently forwarded to the broker's clearing agent and custodian. Finally, the broker reconciles its custodian positions with its retail accounting system which is predominately a manual process. The retail accounting system must be able to handle multiple currencies and the broker must have a process in place for settling the trade in the foreign currency. This process quickly becomes unwieldy as retail volumes expand.

As another example, in order to fulfill an order for cross-border managed funds, a broker first establishes a relationship with a foreign fund manager. On a daily basis, the broker collects orders for particular funds throughout the day by way of its call center, customer fax, or web site, and sends a consolidated order for each fund to the fund house. The next day the broker receives confirmations from the fund houses that are processed against the original orders. Brokers then settle the transactions on behalf of their customers, keeping track of varying settlement instructions by currency by fund manager. Additionally, the broker ensures fund share registries have been properly updated, confirmations of which may be received days later by post, and the broker reconciles statements received from the fund managers to its retail accounting records.

As illustrated in the above illustrative examples, the communication between the broker and the fund manager is often done by fax, telephone, or non-standardized means, which translates into much re-keying, possible data entry errors, lack of standardization in information received, and missing or lost information. While one or more fund managers have tried to automate some aspects of their own systems from time to time, such aspects are limited to communications between a particular broker and a particular fund manager and do not relate to communications between all brokers and all fund managers.

Another problem is that despite the globalization of investment on an institutional level, brokers remain limited in their ability to invest outside of their home country because the process of ordering and paying for "foreign" investment products is filled with complexities and because transaction costs are prohibitive. The majority of the components making up the costs involved in cross-border trading is inherent on there simply being a transaction and does not vary based on the size of the transaction. At the institutional level, this cost is generally small relative to the overall trade value, but can become significant quickly for a retail trade. Such trade-based transaction costs include order routing and settlement messaging. Furthermore, while execution commissions are generally value-based, steep minimums can also contribute to a disproportionate cost for a retail-size order.

In addition to the aforementioned problems, brokers may have difficulty in obtaining other types of information about financial instruments. For example, brokers face difficulties in pricing the security quickly and easily in terms investors understand (e.g., an investor's local currency). In addition, brokers find it difficult to obtain and disseminate current fund prospectuses in the appropriate language. Further, brokers find it difficult to locate the appropriate security identifiers required by the fund managers in order to quote and execute a trade based on security descriptions provided by the broker's investors.

Thus, a need exists for methods and systems for remotely accessing a secure communications network that provides fund managers and brokers a single point of entry to electronically order and confirm various types of financial instruments, as well as to provide additional flexibility and functionality in managing these orders. A need also exists for electronic order routing methods and systems that afford basic checks on order information and that prevent the submission of duplicate information. There is a further need for flexible electronic order routing methods and systems that are able to: (1) monitor the real-time status of a financial order at various stages; (2) accommodate additional financial instruments and additional users as the system expands; (3) facilitate lower transaction and processing costs; (4) provide multilingual capabilities, settlement currencies, and other identifiers necessary to quote and execute an order for a financial instrument; and (5) minimize the manual entry and re-keying of information into multiple formats and templates used by brokers and fund managers.

SUMMARY OF THE INVENTION

To overcome these problems, the present invention provides easy, efficient, and reliable methods and systems for electronic order routing that allow a user to select, order, route, confirm, and track orders for multiple financial instruments among multiple buyers and sellers. In a preferred embodiment, the present invention makes use of computer hardware, operating systems, programming languages, software applications, and other technology to provide end-to-end, straight-through-transaction processing methods and systems for multiple financial instruments combining order routing, execution, settlement, foreign exchange (FX), and custodial services to multiple financial service providers with a retail customer base.

The present invention allows the same set of financial service providers and others like them to extend their breadth of financial instrument offering to include foreign equities, managed funds, and/or fixed income products. Moreover, it makes use of other client-server utilities to streamline the process of notifying the cash management bank, clearing agent, custodian, intermediary, or other party to the financial transaction as well as automate the reconciliation process.

In an embodiment of the present invention, order information is transmitted using web-based technology or using a computer-to-computer interface (e.g., a direct link to a user's order capture system). For example, the order or other transactional information transmitted by the broker is formatted to FIX, SWIFT, or another standard electronic format, and then is transmitted and stored to a communications network that the fund manager can access and act on. Once executed, the fund manager transmits a confirming message to the communications network and the broker can access the confirmation. Additionally, the communications network manages settlement messages that are accessible to a clearing agent/custodian. Throughout these processes, the communications network allows access by any of the users to track the status of the orders and report on exception items. In another embodiment, the present invention links in executable FX rates allowing the broker to quote the security in a local currency and immediately and efficiently execute a FX trade.

The present invention provides the broker with one point of access to various financial instruments and markets by its ability to route orders for multiple instrument types using multiple ordering protocols. In an embodiment of the present invention, a network provides a front end interface, such as, for example, in the form of a computer software application that provides a template for viewing and selecting various financial instruments. Once a financial instrument is selected, the user may place an order to purchase, redeem, or switch shares of the financial instrument (e.g., mutual fund, equity fund, etc.) or upload and monitor order information. As used herein, the term "switch" means a transfer of an investment from one fund to another fund offered by the same fund manager, which generally entitles the purchaser to discounted initial and redemption fees.

An embodiment of the present invention provides an electronic communications infrastructure that involves many fund managers on one side and many brokers on the other side. An important benefit of this infrastructure is the provision of a standard infrastructure to the market that enables all users (e.g., fund managers, brokers, clearing agents, custodians, intermediaries, and other parties to a financial transaction) to use the same system to do all processing on both sides. Another important benefit is the ability to communicate in a standardized manner to users in many different countries.

In an embodiment of the present invention, part of the order information that is input by the broker is the currency in which the broker wants to pay or receive. The broker may be buying or selling a fund denominated in pounds sterling, in US dollars, or in Euros, and they may settle the transaction in whatever that fund currency is. The broker sends his or her settlement in terms of the fund currency and can handle FX conversion themselves. Alternatively, a broker can settle the transaction in his or her home country currency and can designate that the fund manager handle the FX conversion for them. Therefore, another aspect of the present invention includes FX functionality of the system.

Further, the electronic order routing system consists of one or more client terminals that work in conjunction with a communications network(s), network server(s), and database(s). The client terminal is an interactive electronic communications device, such as, for example, PC's and/or servers running UNIX or LINUX, a Macintosh, a personal digital assistant (PDA), a pen-based computer, an interactive pager, mobile and cellular phones, a WAP phone, an interactive television, and the like. The client terminal gets all the data it needs to display "user modules" (i.e., screens that a user views) by requesting the needed data from the network server. For example, instead of a broker manually filling out its own template for sending out an order, a standardized order form in an electronic transfer medium, such as, an interactive web page, is displayed on a client terminal coupled with a network server connected to a communications network. The order is electronically transmitted to the communications network where the data is stored to a database and may be accessed by another user (e.g., a fund manager) to execute an order.

In an embodiment of the present invention, the electronic order routing system supports user modules that represent screens displayed on a client terminal and that allow a user to view, input, select, and/or transmit order attributes. The user module known as the "Broker User Module-View Rate" displays a list of financial instruments available for a broker to purchase or sell. When the broker selects a particular financial instrument, the "Broker User Module-Purchase Transaction" is automatically launched. The broker is then able to enter instructions, such as instructions for book shares, settlement, dealing terms, in order to purchase an order for a desired financial instrument. After the broker has entered all of the required fields to place an order, the broker clicks on the "Submit" icon on the screen and the present invention performs a series of checks regarding the validity of the order information. Once the order is verified, the order is transmitted to the network server, added to the database, and made accessible to the appropriate fund manager.

In an embodiment of the present invention, at any time up to completion of the order, a broker may be allowed to cancel the broker's order, depending upon whether the fund manager allows it, and any such changes are pending until confirmed. The user has access to a Status User Module as well as a selection of reports. The system for an embodiment of the present invention provides a mechanism for both sides of the equation to communicate the details of orders and prices and order status in an automated way and allows for more of a straight-through-process of the transaction.

In addition to providing the methods and systems outlined above, the present invention: (1) provides parties to a financial transaction with one point of access to various financial instruments and markets; (2) allows parties to a financial transaction to achieve straight-through-processing; (3) permits users to easily add financial products and service providers; (4) notifies third parties (e.g., cash bank, clearing agent, custodian, etc.) to automatically settle and arrange payment of the financial transaction; and (5) electronically reconciles custodian data with data in retail accounting systems.

Further details on these embodiments, other possible embodiments, and additional methods and systems of the present invention are set forth below.

As is appreciated by those of ordinary skill in the art, the methods and systems of the present invention have wide utility in a number of areas as illustrated by the wide variety of features and advantages discussed below.

It is a feature and advantage of the present invention to provide electronic order routing that gives multiple buyers and sellers a single point of entry to a variety of financial instruments, such as mutual funds, that are ordered as opposed to being traded against a standing price.

It is another feature and advantage of the present invention to provide electronic order routing that provides brokers a view of indicative mutual fund prices for those funds available to order or available for another financial transaction.

It is another feature and advantage of the present invention to provide electronic order routing that allows users to select financial instruments and place an order to purchase, redeem, or switch.

It is another feature and advantage of the present invention to provide electronic order routing that affords basic checks on order information and prevents the submission of duplicate orders.

It is another feature and advantage of the present invention to provide electronic order routing that returns confirmation of an order with pricing information to the user.

It is another feature and advantage of the present invention to provide electronic order routing that allows brokers and fund managers to view order status at various stages, including affirmation that the fund manager has received orders.

It is another feature and advantage of the present invention to provide electronic order routing and distribution that enables automatic generation of cash transfer information to third parties (e.g., custodians, clearing agents, etc.) upon matching of settlement instructions (e.g., generate pre-advices or payment messages).

It is an added feature and advantage of the present invention to provide electronic order routing and distribution that enables the transfer and verification of commission information.

It is another feature and advantage of the present invention to provide electronic order routing and distribution in which information required to set up accounts with fund managers is transmitted from brokers.

It is another feature and advantage of the present invention to provide electronic order routing and distribution that affords incremental marketing information on funds and/or fund analysis.

It is another feature and advantage of the present invention to provide electronic order routing and distribution that incorporates special requirements for small intermediaries (e.g., Independent Financial Advisors).

It is another feature and advantage of the present invention to provide electronic order routing and distribution that allows portfolio switching.

It is another feature and advantage of the present invention to provide electronic order routing that allows a user to select settlement currencies and related instructions.

It is another feature and advantage of the present invention to provide a user with capability to conveniently create an order for a financial instrument and to conveniently transmit the order to the communications network when it is convenient to the user to do so.

It is another feature and advantage of the present invention to provide for editing of an order and/or related data.

It is another feature and advantage of the present invention to allow a user to: (1) enter and submit electronic orders; (2) track the status of all orders; (3) modify previously submitted orders (if allowed by a fund manager); and (4) utilize user modules and financial data similar to those used by other users.

It is another feature and advantage of the present invention to make it easier for financial institutions (e.g., businesses, financial service providers, etc.) to accommodate growth in the number of users and/or parties to a financial transaction.

It is another feature and advantage of the present invention to support various financial transactions, including new financial transaction as they evolve and are defined by the financial market.

It is another feature and advantage of the present invention to provide a flexible electronic order routing system that is capable of accommodating changes in the system architecture.

It is another feature and advantage of the present invention to provide an electronic order routing system that is capable of running on many different hardware platforms, operating systems, programming languages, software applications, and with other computer technology.

It is another feature and advantage of the present invention to have one standardized user interface regardless of a user's computer system (i.e., the hardware platforms, operating systems, programming languages, software applications, and other computer technology).

It is another feature and advantage of the present invention to allow a user to select a language (e.g., English, French, Spanish, German, etc.) to display user module information, including data that is uploaded or downloaded by a user.

It is another feature and advantage of the present invention to allow a user to store data on a local computer or local network.

It is another feature and advantage of the present invention to provide on-line system help to the user.

It is another feature and advantage of the present invention to provide for multiple levels of user access and to facilitate multiple levels of security related to those levels of user access.

It is another feature and advantage of the present invention to secure the source code on the network server.

It is another feature and advantage of the present invention to interface and communicate with the network communications system through a variety of electronic mediums, including wireline and wireless technology, such as, for example, WAN, LAN, PSTN, satellite systems, other public and private communications networks, and the like.

It is another feature and advantage of the present invention to provide electronic order routing and distribution that enables automated input/output from broker order systems and from fund manager systems.

It is another feature and advantage of the present invention to allow a user to upload or download financial transaction data to a network management system server.

It is another feature and advantage of the present invention to store, maintain, and manage financial transaction data to a network management system server.

It is another feature and advantage of the present invention to use diverse communication devices (e.g., PCs, Macintosh, pen-based computers, interactive telephones, interactive television, interactive pagers, etc.) to access and communicate with the automated document matching system.

It is another feature and advantage of the present invention to provide real-time access to documents associated with a financial transaction.

It is another feature and advantage of the present invention to provide a user with access to a variety of optional additional useful administrative features, such as, for example, changing a password, adding users, and setting defaults.

It is another feature and advantage of the present invention to minimize the amount of paper work generated by: (1) selecting, placing, confirming, and executing an order; (2) settlement and payment reports with third parties; and (3) reconcilement accounting.

It is another feature and advantage of the present invention to provide labor savings by eliminating the need for manual entry of financial transaction data and coordination of documentation efforts among multiple parties (e.g., fund managers, brokers, custodians, clearing agents, etc.) to complete a complex financial transaction.

It is another feature and advantage of the present invention to allow for single data entry in order to eliminate the mistakes caused by the re-entry of data by multiple users, and accordingly, to reduce the need for personnel to enter order attributes.

It is another feature and advantage of the present invention to significantly reduce the time required by the overall process to select, place, confirm, and execute an order.

It is another feature and advantage of the present invention to provide an automated document matching system for a financial institution's communications network.

These uses may be accomplished singularly, or in combination, in one or more of the embodiments of the present invention.

Additional uses, objects, advantages, and novel features of the invention is set forth in the detailed description that follows and becomes more apparent to those skilled in the art upon examination of the following or upon learning by practice of the invention.

BRIEF DESCRIPTION OF THE FIGURES

Other objects and advantages of the invention is more clearly understood by reference to the following description taken in connection with the accompanying figures, in which:

FIGS. 8–31 illustrate user modules that display and prompt a user to view, input, select, and/or transmit information in one or more embodiments of the methods and systems for electronic order routing.

FIG. 32, entitled "List of Database Fields in the 'View Order' User Modules" identifies data fields, provides a brief description, indicates if a data field is present, and provides a sample input for each data field used to view orders by brokers and fund managers in an embodiment of the methods and systems for electronic order routing.

DETAILED DESCRIPTION

The present invention will now be described in more detail by illustrative examples with reference to the embodiment(s) depicted in the Figures. The following described embodiment(s) is presented by way of example and should not be construed as limiting the inventive concept to any particular configuration.

Figure 1:
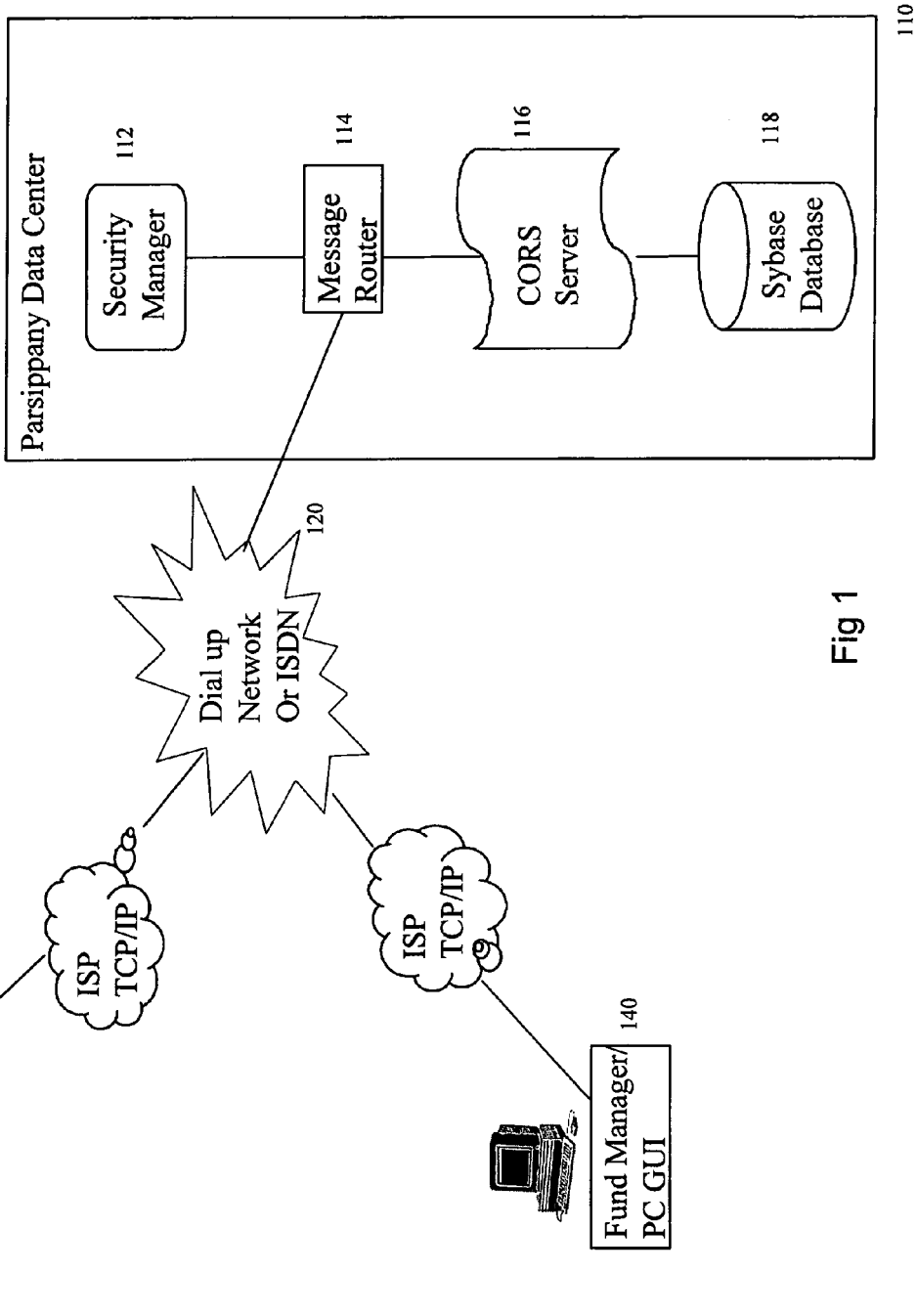
FIG. 1, entitled "Communications Hardware Topology," illustrates an overview of the network topology in an embodiment of the methods and systems for electronic order routing.

Referring to FIG. 1, a basic overview of the communications hardware topology according to an embodiment of the present invention is depicted. As shown in FIG. 1, the parsippany data center 110 includes a security manager 112, a message router 114, a server 116, and a database 118. The parsippany data center 110 is coupled to a plurality of client terminals 130, 140 using a communications network 120 using Transmission Control Protocol/Internet Protocol (TCP/IP). In this embodiment, the present invention makes use of a virtual private network. Clients can dial in through a modem, over integrated services digital network (ISDN), or over a fixed line, such as, for example, a leased line to access the communications network 120. Alternatively, the system operates over the Internet with suitable bridges and security.

The electronic order routing system includes at least one client terminal 130, 140. The client terminal 130, 140 typically includes a central processing unit (CPU), a monitor or other visual display device, a keyboard or some other input device, and a communications device, such as a modem. Further, each client terminal 130, 140 is electronically connected to at least one communications network 120.

In an embodiment of the present invention, the client terminal 130, 140 may be any PC running a Windows operating system or may be a Windows NT workstation with access to a global communications network, such as, the Internet. For example, the client terminal may be a PC that supports either Internet Explorer or Navigator to provide access to the Intranet or Internet. Alternatively, it should be appreciated that the client terminal could take on a variety of other suitable forms, such as, for example, PC's and/or servers running UNIX or LINUX, a Macintosh, a PDA, a pen-based computer, an interactive pager, mobile and cellular phones, a WAP phone, an interactive television, and the like. Furthermore, the client terminal could be electronically connected to a network communications system by way of other wireline or wireless technology, including, for example, WAN, LAN, PSTN, public networks, satellite systems, and the like.

Client terminals 130, 140 transmit and receive data from a network server via a communications network. Client terminals 130, 140 interact with the network server 116 in a typical client/server platform. The operation of the system according to the embodiment shown in FIG. 1 is as follows. A broker at client terminal 130 places an order to purchase, redeem, or switch a financial instrument, such as, for example, a mutual fund. The network server 116 either creates a new object in the database 118 or modifies an existing object in the database 118 to show the order. A user sitting at a client terminal 130 enters the system and requests information about specific financial instruments.

Once the user has received requested information regarding particular financial instruments, the user selects one of the financial instruments to order. The user sets parameters for an order, inputs additional information, and submits the order to the server 116. The order goes through an authentication and verification process and is then forwarded from the server 116 to the database 118. Another user may then access the communications network to confirm and further process the order.

In an embodiment of the present invention, not all users are permitted to access the same capabilities. Every user of the network server must go through a security check. Users of the server 116 are organized into a security hierarchy. High-level security users are permitted to access more sensitive system functions than low-level security users. Thus, highly secure users may access a wide range of system functionalities, while lower security level users may simply access tracking and reporting functionalities. For example, users of the server 116 may be categorized into three types: fund distributor (broker), fund manager, and customer administrator. A security check is protected by passwords such that users are authorized to access only their own system functionality. A broker can only access functionalities associated with a broker and is not allowed to access functionalities associated with a fund manager or with a customer administrator. The same security protection applies to a fund manager or a customer administrator towards other counter-parties.

A feature of the present invention is the use of universal code, such that any client terminal 130, 140 may access the server 116 regardless of the platform of the client terminal 130, 140. Thus, a user may initiate an order at a first client terminal 130, such as, for example, a PC terminal, be interrupted, and complete the order at a second client terminal 140, such as, for example, a UNIX terminal.

In an illustrative embodiment of the present invention, the electronic order routing system is a C program running on a VMS operating system as the platform in a VAX server. The database 118 is a Sybase System 11. The program is downloaded locally to the client terminal 130, 140 by accessing a web-page on the server 116. The interactive user interface of the client terminal 130, 140 is configured using Visual Basic under Windows NT to run the program. Variations in the programming languages, software platforms, operating systems, hardware components, and other technology mentioned in this preferred embodiment may always be enhanced to incorporate the most advanced available technology.

Figure 2:
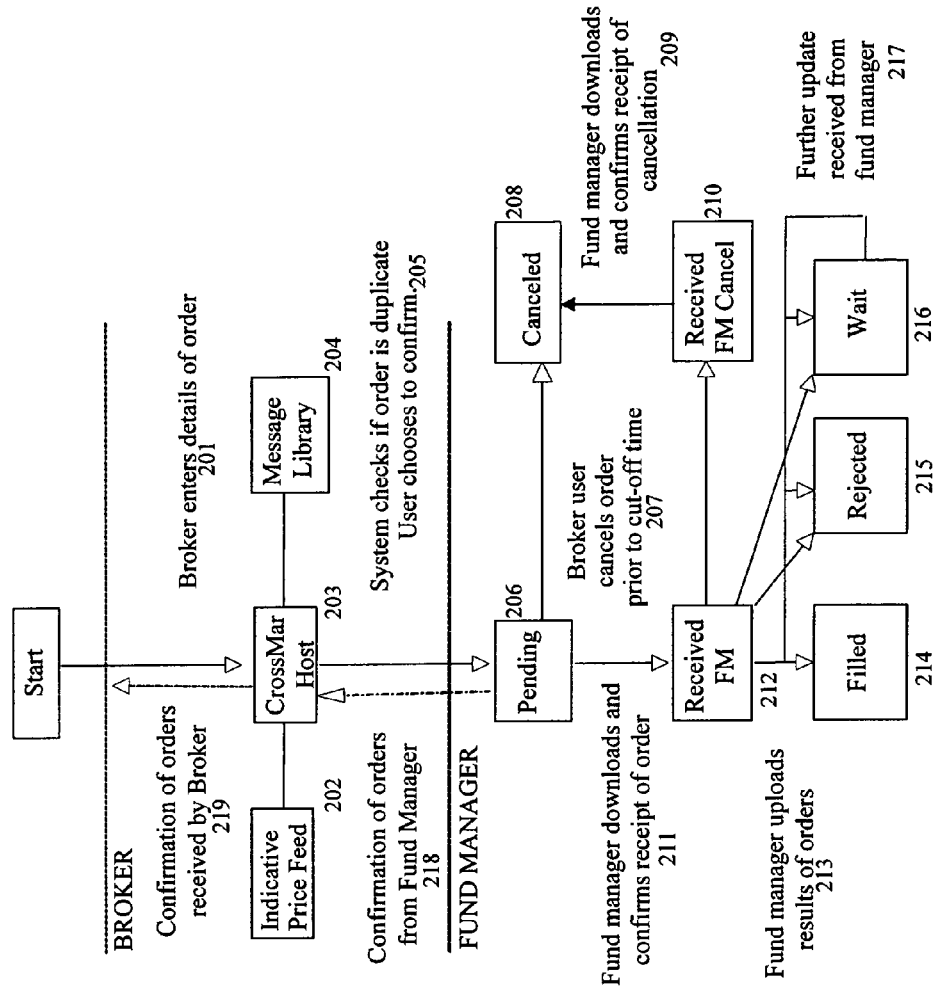
FIG. 2, entitled "System Process-Phase 1," illustrates the system process in an embodiment of the methods and systems for electronic order routing.

Referring now to FIG. 2, the system process is depicted in which a broker enters details of an order 201 into the CrossMar Host 204. The CrossMar Host 204 communicates with the Indicative Price Feed 202 and with the Message Library 204. The system check to see if the order is duplicated, and the user (e.g., broker) can choose to confirm the order 205. The order is then pending 206 in the system. Once an order is pending 206, either a broker can cancel the order prior to cut-off time 207, or a fund manager downloads and confirms receipt of the order 211. If the broker cancels, it is cancelled in the system 208. If the fund manager downloads and confirms receipt of an order 211, then the order is received in the system 212. Once an order is received 212, the order can be filled 214, rejected 215, or waiting 216 for further instructions from a fund manager 217. Additionally, the broker can receive a cancelled transaction 210. After the fund manager acts on the order, the system recognizes confirmation of order from the fund manager 218 as well as confirmation of orders received from a broker 219. Further details of the process are described in Table 1 below.

TABLE 1

Details of System Process

| State | Description |
| --- | --- |
| CrossMar Host 203 | New order entered by the broker but not yet confirmed for processing. Entered orders are ignored by the fund manager. |
| Pending 206 | Complete order pending upload to the fund manager. |
| ReceivedFM 212 | Order that has been transmitted to the fund manager. |
| ReceivedFMCancel 210 | Order that was transmitted to the fund manager but subsequently cancelled by broker |
| Cancelled 208 | Cancelled order that has been transmitted to the fund manager. |
| Filled 214 | Order filled by the fund manager. |
| Rejected 215 | Order rejected by the fund manager |
| Wait 216 | Order wait, pending further update from fund manager |

Figure 3A:
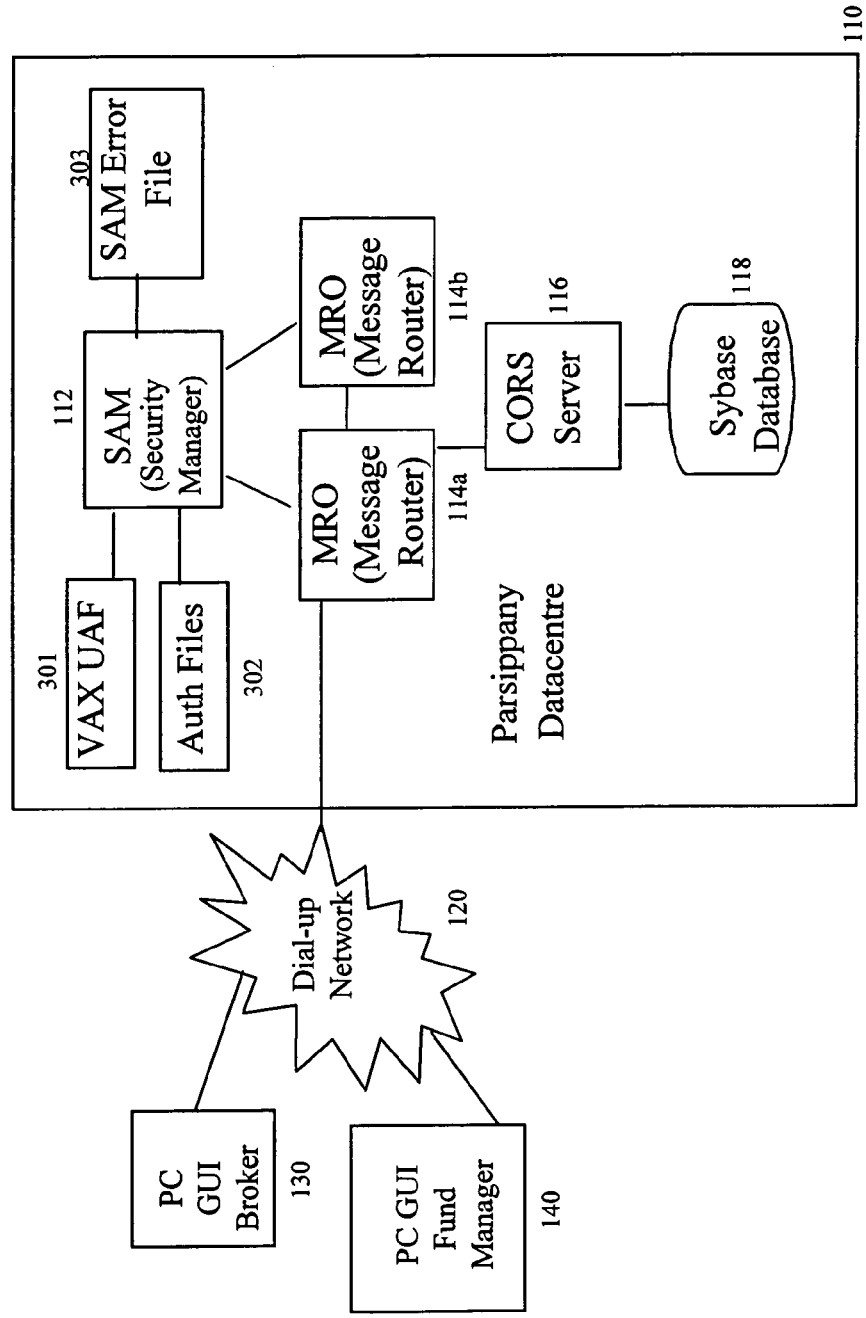
FIG. 3A, entitled "System Schematic," illustrates the system schematic in an embodiment of the methods and systems for electronic order routing.
Figure 3B:
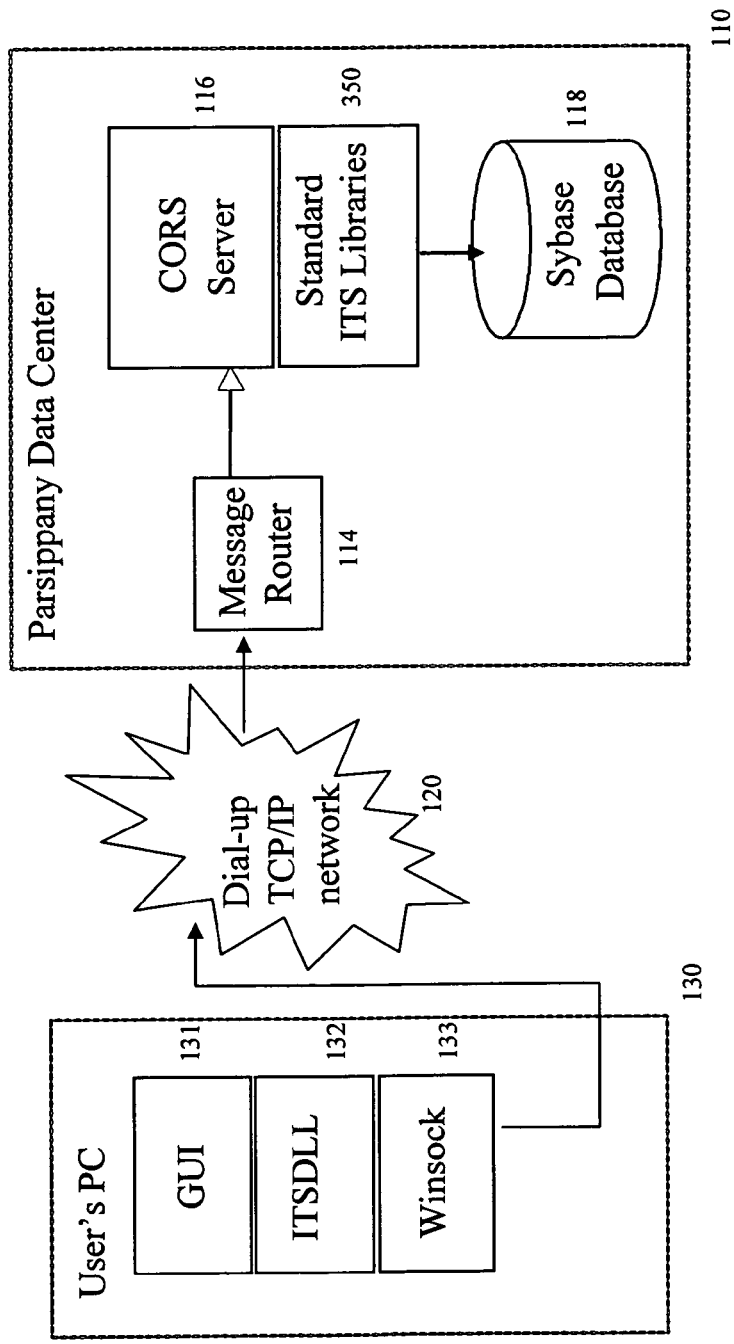
FIG. 3B, entitled "Design Overview," illustrates the design overview in an embodiment of the methods and systems for electronic order routing.

FIG. 3A, entitled "System Schematic," and FIG. 3B, entitled "Design Overview," further illustrate the network topology and communication details in embodiments of the methods and systems for electronic order routing. For example, in FIG. 3A, the security manager 112 is coupled with authorization/confirmation files 301, 302 and with an error file 303. In FIG. 3B, the client terminal 130 comprises a GUI application 131, a 32 bit DLL 132, and a standard DLL 133. Further, the server 116, is coupled with a standard database library 350 that communicates with the database 118.

The GUI application 131 for an embodiment of the present invention can be programmed to take in most any format of spreadsheet that a fund manager or a broker happens to have. In this way, a fund manager can import his or her latest prices every morning into the system, and the latest prices will then be available to any of the brokers that come into the system.

In an embodiment of the present invention, another function that the fund manager has is the ability to export orders that have been placed on the system by the brokers into another spreadsheet. They can then take those orders and either fill them manually or upload the spreadsheet into their order administration systems and later on in the same day generate a spreadsheet from their system of filled orders which they would import into the system for an embodiment of the present invention. Thus, an aspect of an embodiment of the present invention provides an electronic interface through the spreadsheets.

As an example of the process flow for an embodiment of the present invention, the broker logs in to the system in the morning and browses through the funds. When the broker finds funds for which the broker wishes to transact, the broker enters an order. At a later time, the fund manager accesses the same system, downloads the orders, and fills them. At a still later time in the day, the fund manager uploads the filled orders into the system, so that they can be accessed by the broker. The broker can then look them up and print them out. An important aspect of an embodiment of the present invention is providing messaging between the broker and the fund manager, which replaces the faxes that were previously sent between the two.

Typically, fund prices change only once a day, so the constraints on the broker are that they must enter all of their orders by the fund cutoff, which is some time in the early afternoon, depending on the fund. Therefore, the broker can enter orders at any time up until that point. After that point, they cannot enter orders for that same day but can only enter orders for the next day. It is at that point that the pricing of the order and filling of the orders begins at the fund manager. Accordingly, some time after cutoff, the broker gets the results of the orders that they placed.

The broker is generally acting on behalf of retail customers who can simply telephone or otherwise communicate with the broker and tell the broker that they want to purchase, redeem, or switch a certain number of shares or monetary amount of a particular mutual fund. The broker then puts that order into the system for an embodiment of the present invention. The fund manager that is actually maintaining that fund sees the order and then, later in the day, the fund manager executes that order and passes back to the broker the fund pricing information and the total funds due to or due from the broker. The broker's wholesale cost will vary depending on his arrangement with the fund manager. The broker provides the retail price to the client.

Figure 4:
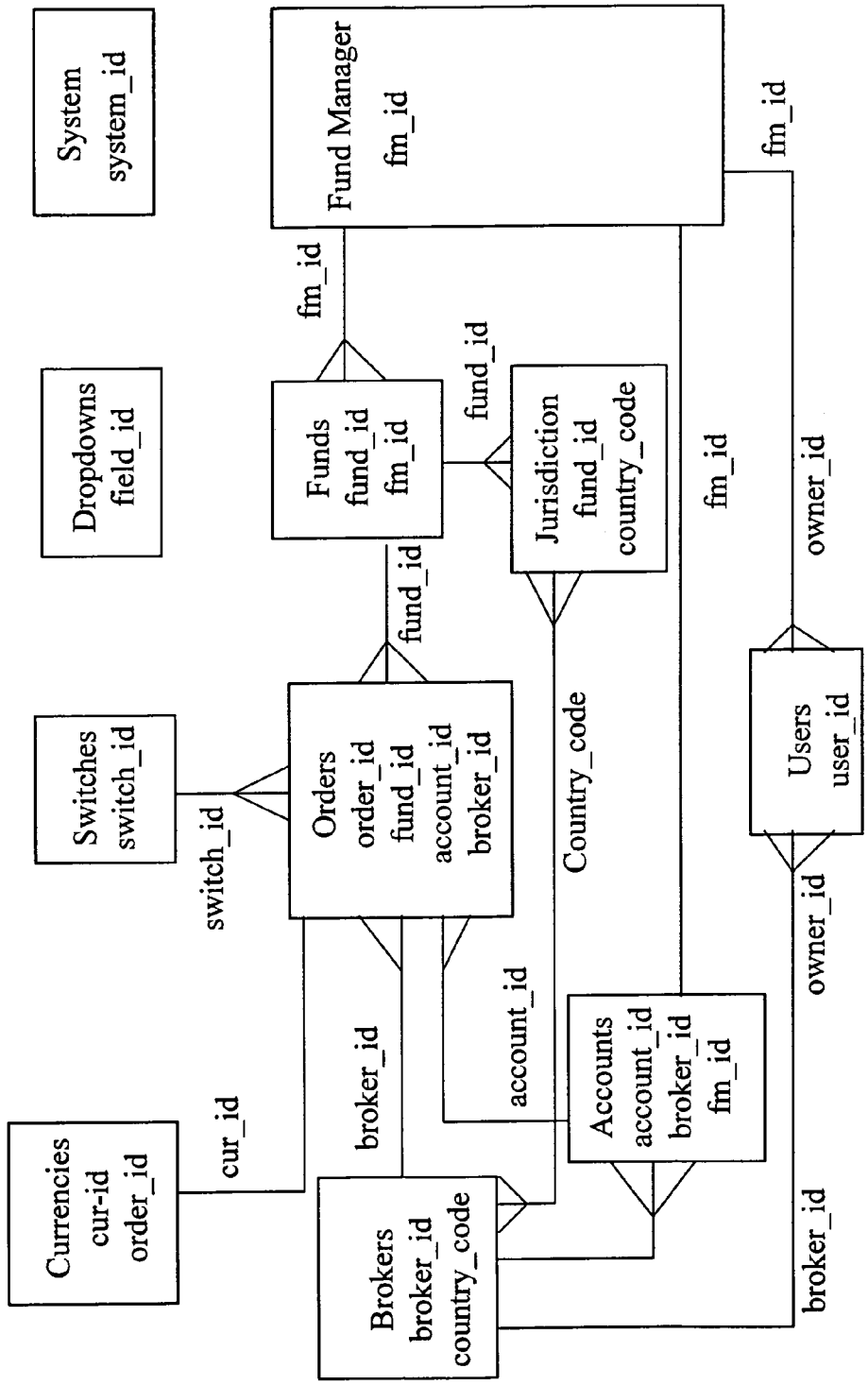
FIG. 4, entitled "Database Schematic," shows the databases and relationships between databases in an embodiment of the methods and systems for electronic order routing.

FIG. 4, entitled "Database Schematic," shows the databases and relationships between databases in an embodiment of the methods and systems for electronic order routing. The database tables are shown in the boxes and the lines depict the relational model between the tables, with the identifiers that join the tables. Table 2 below further explains the database tables.

TABLE 2

Description of Database Tables

Users - contains the user name, ITS address, type (e.g., fund manager or broker), privilege, and other information for each user of the system. The user table contains an 'Owner_id' field which links to either the Brokers table or the Fund Manager table depending on the user type.
Brokers - contains the details of the brokerage firms, each firm being represented by a record in the table.
Accounts - contains the notion of a broker's account with a fund manager. The accounts determine if the broker has a trading relationship with the fund manager and hence can see their funds' prices.
Orders - contains the detail of each order, including order state, date, fund, and financial information.
Switches - relates several orders together for the purpose of switch transactions.
Funds - contains fund details, including indicative rates. Each fund relates to one particular fund manager.
Jurisdiction - determines the country codes where a fund is available, hence determines which funds are available to each broker.
System - contains the version number of the database for the automated build procedure.
Dropdown - contains lists of drop-down information used to populate fields on the GUI.

Figure 5:
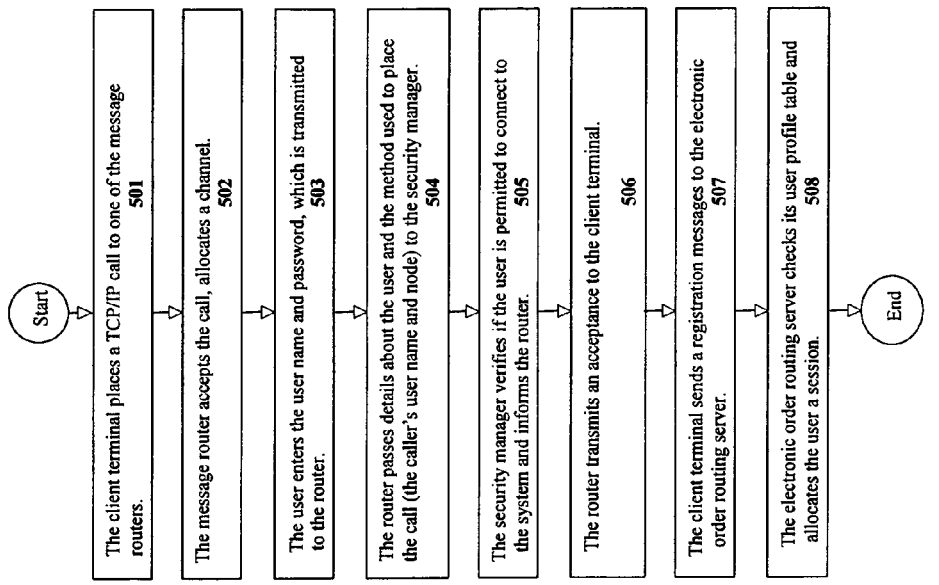
FIG. 5, entitled "Viewing Order Detail," is a process flow model for viewing order detail in an embodiment of the methods and systems for electronic order routing.

FIG. 5, entitled "Logging On," is a process flow model for logging onto the system in an embodiment of the methods and systems for electronic order routing. In step 501, the client terminal 130, 140 places a TCP/IP call to one or more of the message routers 114. In 502, the message router 114 accepts the call and allocates a channel. In 503, the user enters the user name and password, which is transmitted to the message router 114. In 504, the message router 114 passes details about the user and the method used to place the call (e.g., the user's name, node, etc.) to the security manager 112. In 505, the security manager 112 verifies if the user is permitted to connect to the system and informs the message router 114. In 506, the message router 114 transmits an acceptance to the client terminal 130, 140. In 507, the client terminal 130, 140 sends a registration message to the server 116. In 508, the server 116 checks its user profile table, and allocates the user a session.

Figure 6:
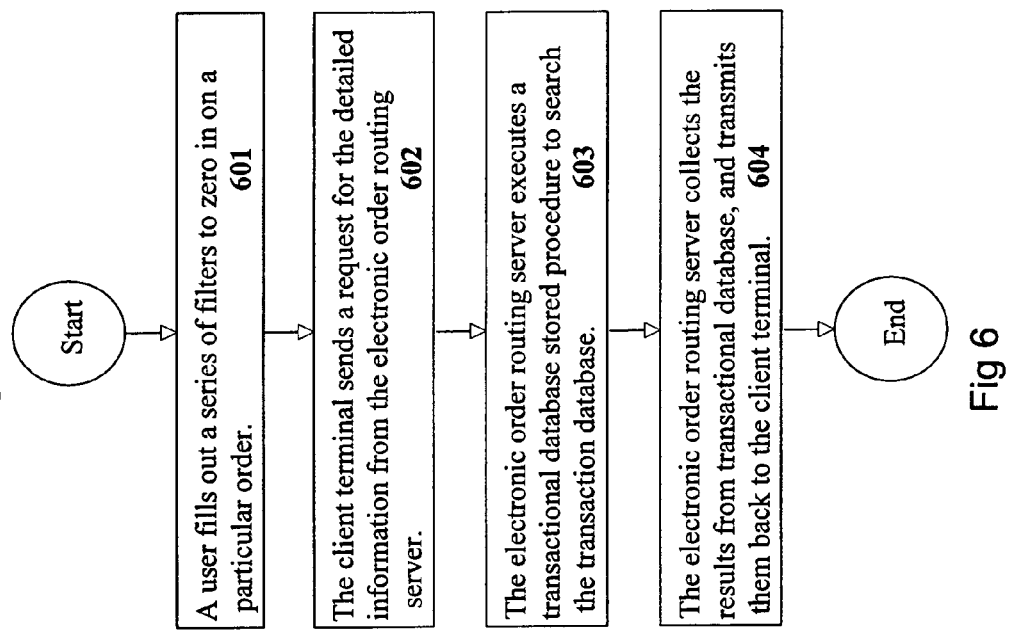
FIG. 6, entitled "Logging On," is a process flow model for logging onto the system in an embodiment of the methods and systems for electronic order routing.

FIG. 6, entitled "Viewing Order Detail," is a process flow model for viewing order detail in an embodiment of the methods and systems for electronic order routing. In step 601, the Broker user fills out a series of filters to zero in on a particular order. In 602, the client terminal 130, 140 sends a request for the detailed information from the server 116. In 603, the server 116 executes a transaction database stored to search the transaction database 118. In 604, server 116 collects the results from the transactional database 118, and transmits them back to the client terminal 130, 140.

Figure 7:
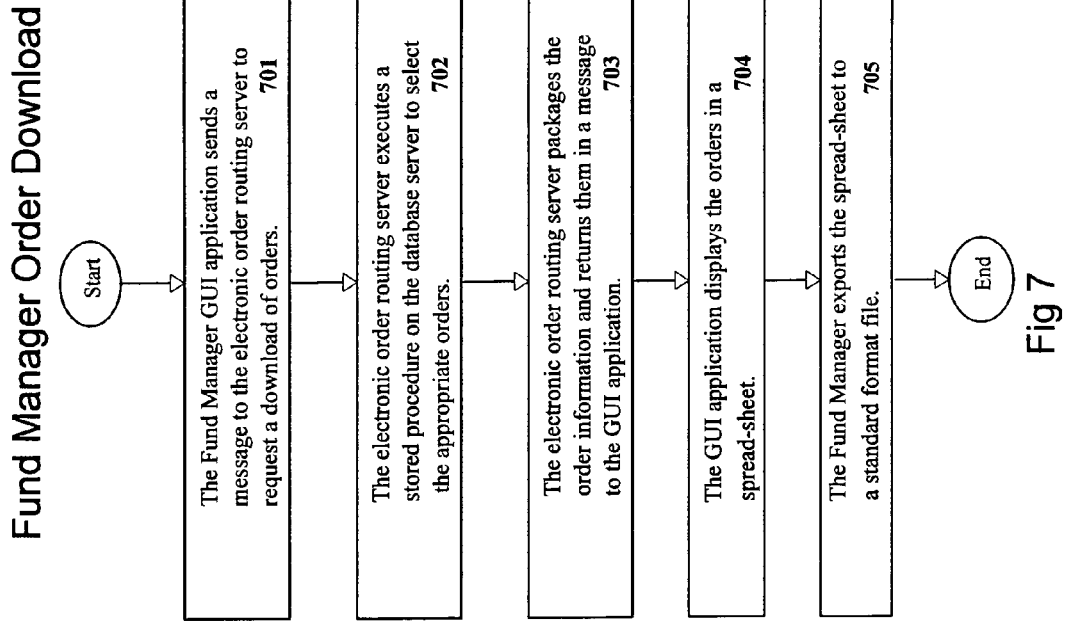
FIG. 7 entitled "Fund Manager Order Download," is a process flow that a fund manager would follow to download an order in an embodiment of the methods and systems for electronic order routing.

FIG. 7 entitled "Fund Manager Order Download," is a process flow that a fund manager would follow to download an order in an embodiment of the methods and systems for electronic order routing. In step 701, the fund manager client terminal GUI application sends a message to the server 116 to request a download of orders. In 702, the server 116 executes a stored procedure on the database server to select the appropriate orders. In 703, the server 116 packages the order information and returns them in a message to the GUI application. In 704, the GUI application displays the orders in a spread-sheet. In 705, the fund manager exports the spread-sheet to an excel format file (or to another standardized file).

Turning now to the illustrative user modules depicted in FIGS. 8–31, these modules represent screen shots that display and prompt the user to view, input, select, and/or transmit order or other financial transaction information.

The user modules selectively access software objects populated with data at logon time and prompt the user to select and enter various information/data about an order or other transaction. These modules can be categorized into the following two categories—Broker User Modules and Fund Manager User Modules—and are described in detail below.

Broker User Modules

Figure 8:
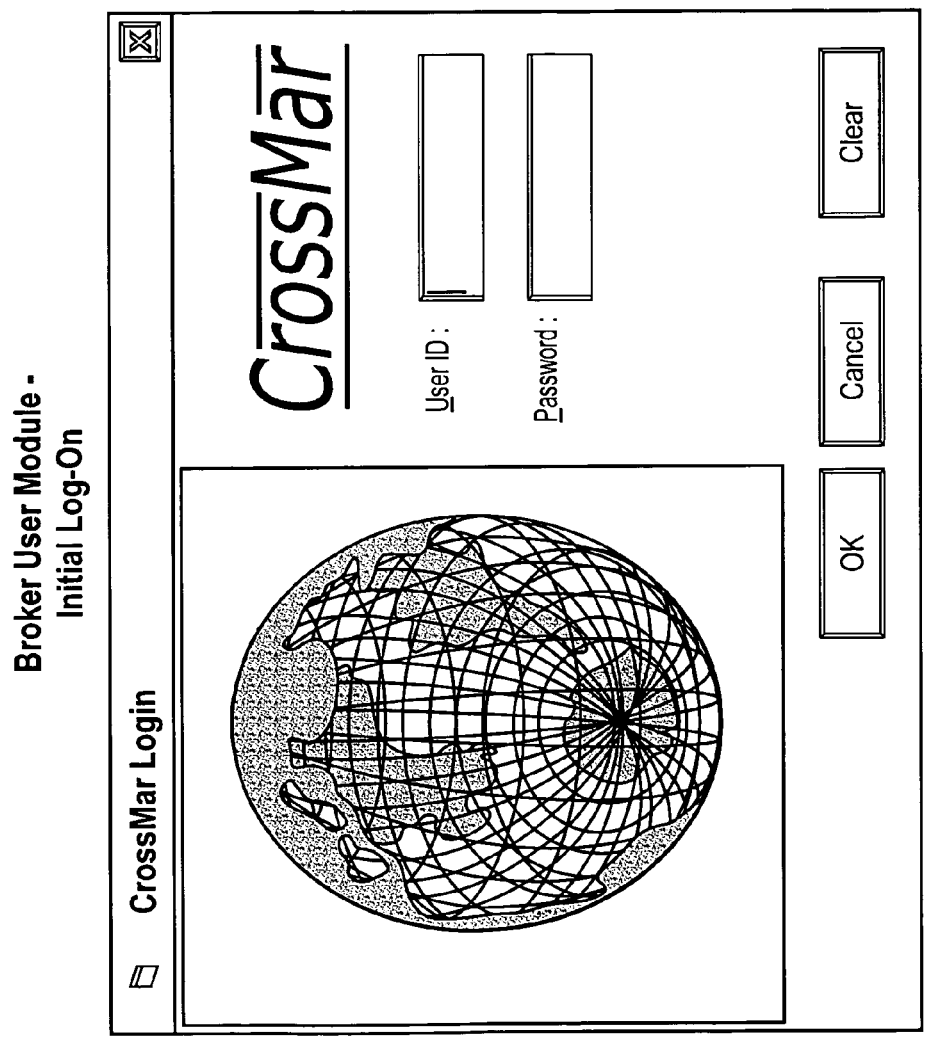

FIG. 8 depicts an embodiment of the "Broker User Module-Initial Log-on" illustrating the logon user module for a broker. The broker logs onto the system inputting his or her username and password. In an embodiment of the present invention, this is validated by the central process and if invalid, the application terminates. If three inaccurate logons are attempted the account is disabled and a call is necessary to the administrator for reset. All passwords must comply with a secure format policy.

Figure 9:
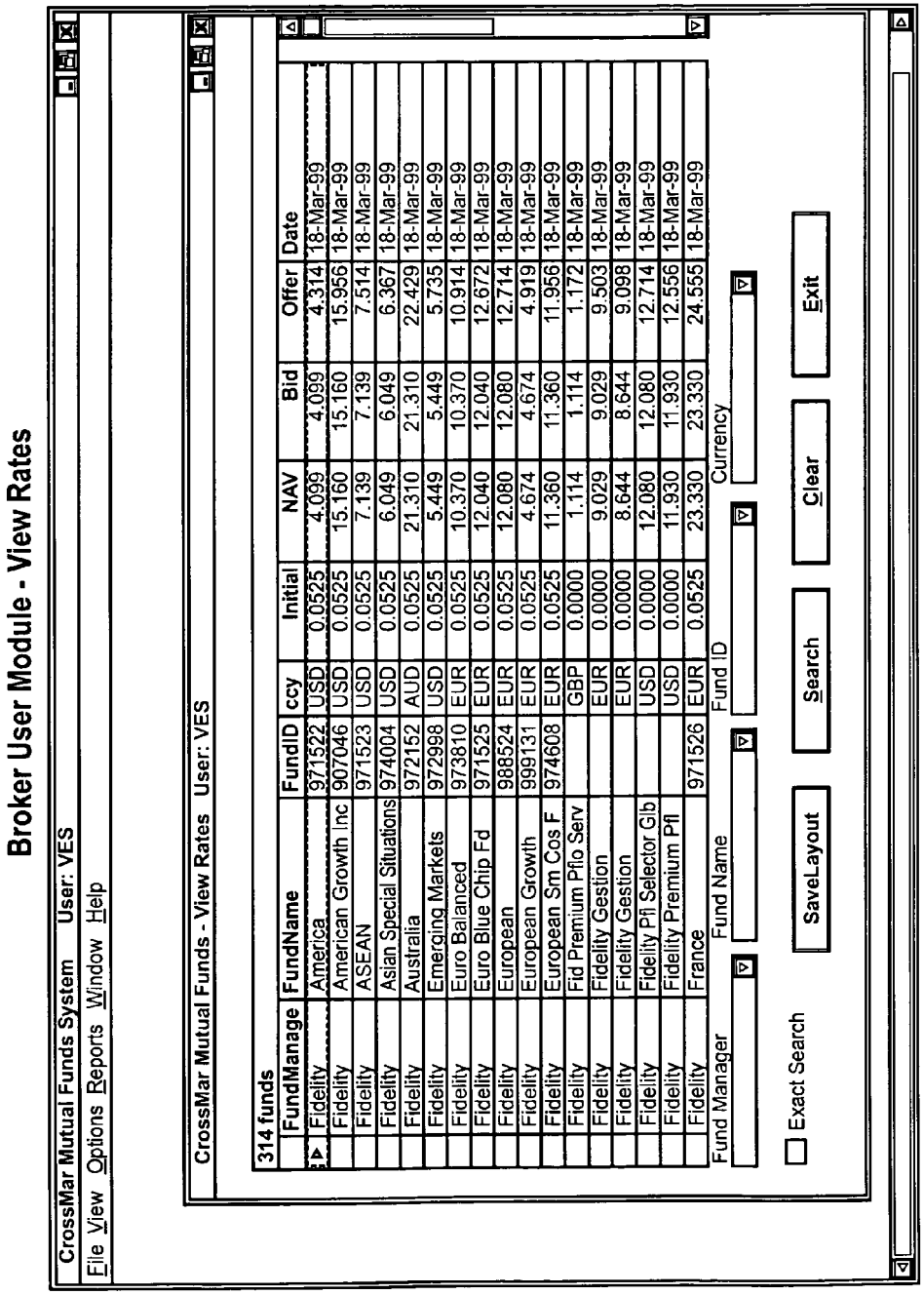

FIG. 9 depicts an embodiment of the "Broker User Module-View Rates" that allows the broker to select the commands and sub-commands from the drop-down menu associated with the functions described in Table 3 below.

TABLE 3

Commands and Sub-Commands from Drop Down Menu Bar

| Command | Sub-Command |
|---|---|
| File | Print - User reports |
|  | Exit - Exit program |
| View | Rates - Go to Rates User Module |
|  | Transactions - Go to Transaction User Module |
|  | Orders - Go to View Orders User Module |
| Options | Change Password - Go to Change Password User Module |
|  | Set Defaults - Go to Set Defaults User Module |
|  | Add Clients - Go to Add Clients User Module |
| Reports | Orders - Run Orders Report |
| Window | Cascade - Perform this function on any open window |
|  | Tile Horizontally - Perform this function on any open window |
|  | Tile Vertically - Perform this function on any open window |
| Help | Mutual Funds - Bring up Help functionality |
|  | About - Display version and license information |

For each offering, a broker is able to view the Fund Manager, Fund Name, Fund ID Number, Currency, Initial Fee %, Redemption Fee %, Type Of Fund, NAV, Bid, Offer, and Pricing Date. There are several possible Fund ID Numbers for each fund. Brokers can select a view of either ISINs, local codes (e.g., Germany WPKN numbers), or clearing organization codes (e.g., CEDEL). For each view, a broker selects either "Global Certificates" or "Registered Shares." The broker has the ability to change the view of the type of Fund ID that is displayed.

In another embodiment, a broker is able to view all mutual funds available for him or her to legally purchase or sell. A broker is usually limited to sell funds that have been registered within a country. Therefore, brokers residing in different countries will have a different view of funds available that depend on the jurisdictional constraints for each fund. Also, all brokers may not deal with all fund managers that are present on the system, thus only fund managers associated with that broker are displayed. In another embodiment, prices are updated daily.

Figure 10A:
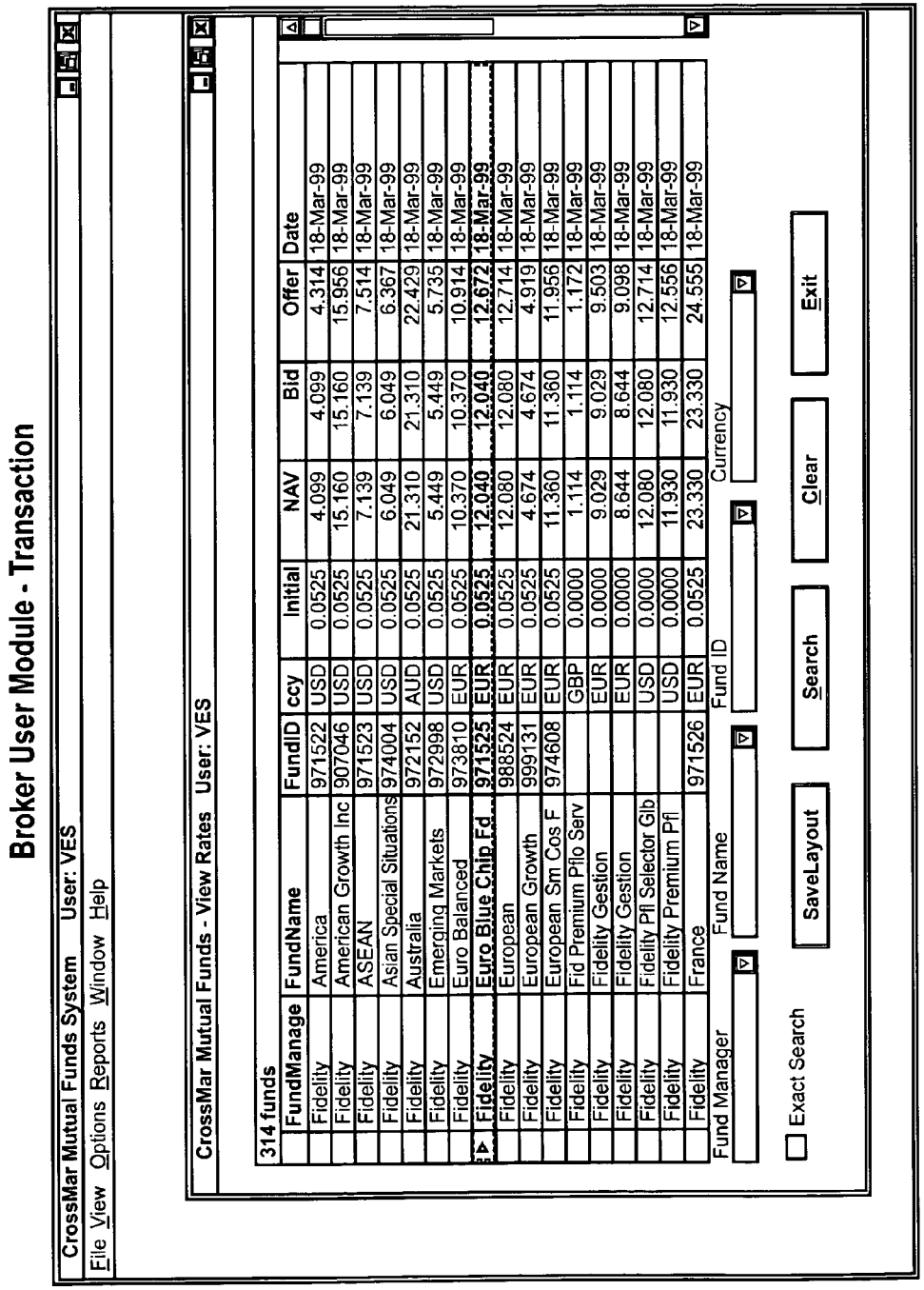
Figure 20A:
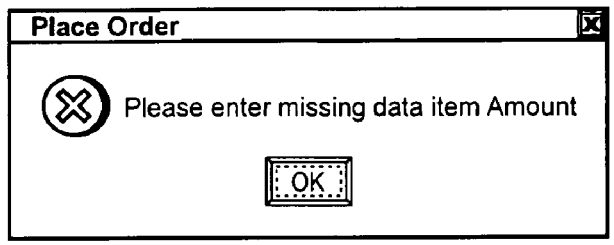
Figure 20B:
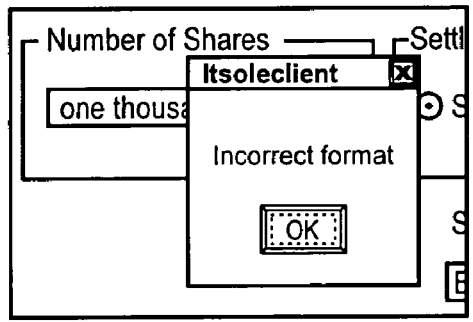
Figure 21:
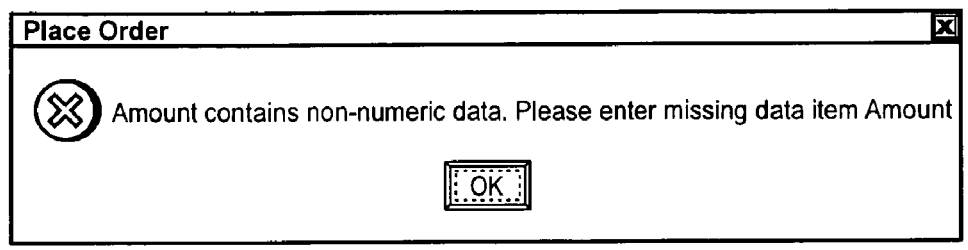
Figure 22A:
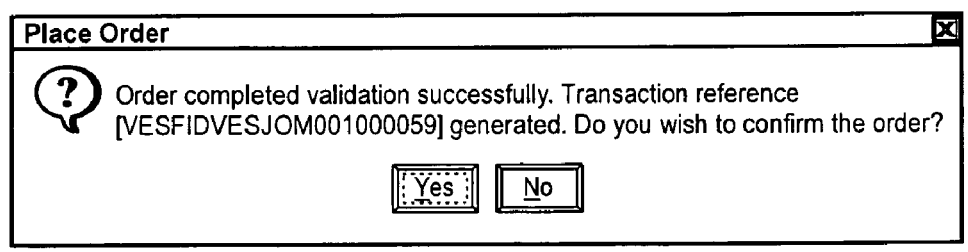
Figure 22B:
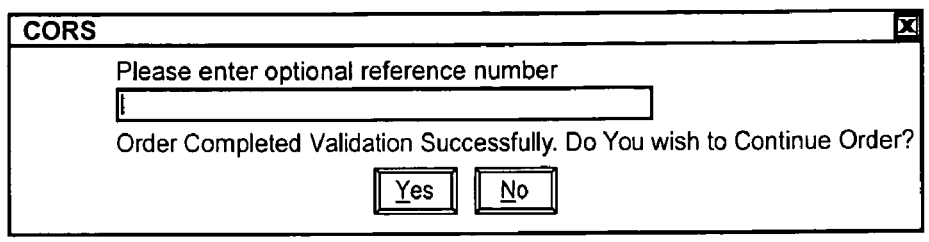
Figure 22C:
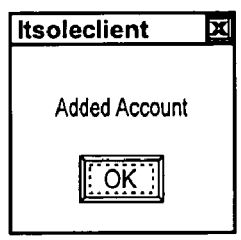
Figure 22D:
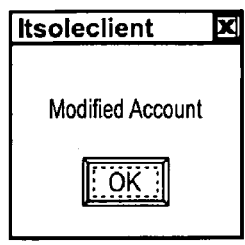
Figure 22E:
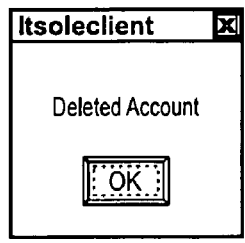

FIGS. 10A and 10B, entitled "Broker User Module-Transaction," depict user modules that a broker views, inputs, selects, and/or transmits transaction information in an embodiment of the methods and systems for electronic order routing.

FIG. 11 is an embodiment of the "Broker User Module-Sample of Fund Pricing with Selection of Fund, "Jump" to Transaction User Module," illustrating a search that uses one or more of the following fields: Fund Manager, Fund Name, Fund ID Number, and/or Currency. The broker is able to input a criterion, select from a list of criteria, and/or specify an exact match if required. The broker can rearrange the columns on this view and save it as a new layout.

Referring now to FIGS. 12, 13, and 14, a broker can enter a transaction user module in one of two ways: (1) "jump" to a transaction user module by selecting a particular fund; or (2) go directly to a transaction user module from the initial menu by selecting the View command and then selecting the Transaction command. After inputting the Fund Name or Fund ID Number, the rest of the fund information is automatically uploaded and displayed to the user module.

The layout for the transaction screen varies depending upon the type of transaction selected as well as certain other information selected within the transaction screen. The system's default is the "Purchase" transaction. Fund Information (Fund Manager, Fund Name, Fund ID, CCY, Initial, NAV, Bid, Offer, Price Date) is displayed at the top of the transaction screen. Menu items on the transaction user module perform the functions described in Table 4.

TABLE 4

Commands on the Transaction User Module

| Command |
|---|
| Exit - Exit user module without processing a transaction |
| Allocate - Allow client level details of an order to be input |
| Next and Previous - Scroll through fund names |
| Submit - Send order through validation checks |

Automatically generated information is provided in the Transaction Reference and Order Status fields as described below. Order Status initially displays a status of Pending order or other financial transactions. There is an addition facility to "copy" all information to be input by the broker from a previously submitted transaction. Once copied, the broker can modify the information and submit it as a new order.

In an embodiment of the present invention, a broker is required to enter the fields identified and described in Table 5 in order to complete a "Purchase" transaction.

TABLE 5

Fields Required by a Broker to Complete a "Purchase" Transaction
Required Field to Complete a Purchase Transaction Book Shares. Brokers select either Nominee (if booking the transaction in an account at the fund manager under their own name) or Client name (if booking the transaction in an account at the fund manager under their client's name). Brokers may buy funds either in their own name or on behalf of a client. In the latter case, client information is forwarded to the fund manager. In either case, the process assumes the broker has a pre-established account number (Nominee or Client).
Basis. Brokers select a purchase in terms of Shares or Cash amounts.
    If Shares is selected, the broker must input a numeric amount in the
    Number of Shares field.
    If Cash is selected, the broker must then indicate:
        Cash Amount - a numeric input
        Transaction Currency - selected from a drop-down list of
                possible currencies in the following
                order: EUR, USD, CHF, GBP, JPY,
                SEK, NOK, CAD, all others appear
                in alphabetical order.
    Rounding - Either Up, Down, or Full+Fraction
Settlement. Brokers select either Standard or Non-Standard. If Non-Standard is selected, then the broker will need to input the following non-standard settlement instructions:
    Bank
    City TABLE 5-continued Fields Required by a Broker to Complete a "Purchase" Transaction
Required Field to Complete a Purchase Transaction Account
    SWIFT code
Account. Broker inputs or selects from a drop down menu an account for the transaction. Note that the list of accounts to choose from will vary based upon the selection under Book Shares described above. The drop-down menu for the list of accounts for transactions booked at the client level is ordered using a Client ID. There is a different set of accounts for each fund manager.
Settlement CCY. The broker makes a selection from a drop-down list of possible currencies, for example, EUR, USD, CHF, GBP, JPY, SEK, NOK, CAD.
Dealing Terms. The broker selects either Standard, Reinvest Commission, or Special Promotion. If Reinvest Commission is selected, a further choice of All, 1%, or 2% is required.
Type of Shares (not included on screen print). The system displays either Global Certificate or Registered depending on the Fund ID. If the broker changes this field (e.g., from Global Certificate to Registered) then the Fund ID in the fund information section changes accordingly.
Transaction Type. The broker selects Purchase, Redemption, or Switch.

In an embodiment of the present invention, a broker may optionally enter the fields identified and described in Table 6 in order to complete a "Purchase" transaction.

TABLE 6

Optional Fields Input by a Broker to Complete a "Purchase" Transaction
Optional Fields to Complete a Purchase Transaction Text Field. This field allows Broker to input a reference number for the transaction or any other information desired.
Allocate. This user module allows the broker to store information as to the underlying client level details of an order. The broker inputs/selects from a Client ID and a corresponding number of shares. The system displays each client's account number.

FIGS. 15 and 16 depict sample user modules for a full redemption and for a partial redemption for cash. In an embodiment of the present invention, a broker is required to enter the fields identified and described in Table 7 in order to complete a "Redemption"

TABLE 7

Fields Required by a Broker to Complete a "Redemption" Transaction
Required Field for a Redemption Transaction Book Shares. Brokers select either Nominee (if booking the transaction in an account at the fund manager under their own name) or Client name (if booking the transaction in an account at the fund manager under their client's name). Brokers may buy funds either in their own name or on behalf of a client. In the latter case, client information is forwarded to the fund manager. In either case, the process assumes the broker has a pre-established account number (Nominee or Client).
Basis. This field is only valid if a Partial selection is selected in the field below. Broker then selects a purchase in terms of Shares, Cash, or Percentage amounts.
    If Shares is selected, the broker must input a numeric amount in the
    Number of Shares field.
    If Cash is selected, the broker must then indicate:
        Cash Amount - a numeric input
        Transaction Currency - selected from a drop-down list of
                possible currencies in the following
                order: EUR, USD, CHF, GBP, JPY,
                SEK, NOK, CAD, all others appear
                in alphabetical order.
    Rounding - Either Up, Down, or Full+Fraction
    If Percentage is selected, the broker must then input a numeric
    input <=100.
Settlement. Brokers select either Standard or Non-Standard. If Non-Standard is selected, then the broker will need to input the following non-standard settlement instructions:

TABLE 7-continued

Fields Required by a Broker to Complete a "Redemption" Transaction
Required Field for a Redemption Transaction Bank
    City
    Account
    SWIFT code
Account. Broker inputs or selects from a drop down menu an account for the transaction. Note that the list of accounts to choose from will vary based upon the selection under Book Shares described above. The drop-down menu for the list of accounts for transactions booked at the client level is ordered by a Client ID. There is a different set of accounts for each
fund manager.
Settlement CCY. The broker makes a selection from a drop-down list of possible currencies, for example, EUR, USD, CHF, GBP, JPY, SEK, NOK, CAD.
Dealing Terms. Standard is the only choice initially.
Transaction Type. The broker selects Purchase, Redemption, or Switch.
Full or Partial. The broker is required to select one type. Note, if Nominee has been selected in the Book Shares field above, the selection Full redemption should not be available.

In an embodiment of the present invention, a broker may optionally enter the fields identified and described in Table 8 in order to complete a "Redemption" transaction.

TABLE 8

Optional Fields Input by a Broker to Complete a "Redemption" Transaction
Optional Fields for a Redemption Transaction Text Field. This field allows Broker to input a reference number for the transaction or any other information desired.
Allocate. This user module allows the broker to store information as to the underlying client level details of an order. The broker inputs/selects from a Client ID and a corresponding number of shares. The system displays each client's account number.

FIGS. 17 and 18 depict sample user modules for a full switch and for a partial switch for cash. When a "Switch" transaction is selected, there are two sets of fund data required. The broker should either be able to input a Fund Name or Fund ID in the second fund area or go back to the Broker User Module-View Rates (FIG. 9) to highlight the second fund for the transaction.

In an embodiment of the present invention, a broker is required to enter the fields identified and described in Table 9 in order to complete a "Switch" transaction.

TABLE 9

Fields Required by a Broker for a "Switch" Transaction
Required Field for a Switch Transaction Book Shares. Brokers select either Nominee (if booking the transaction in an account at the fund manager under their own name) or Client name (if booking the transaction in an account at the fund manager under their client's name). Brokers may buy funds either in their own name or on behalf of a client. In the latter case, client information is forwarded to the fund manager. In either case, the process assumes the broker has a pre-established account number (Nominee or Client).
Basis. This field is only valid if a Partial selection is selected in the field below. Broker then selects a purchase in terms of Shares, Cash, or Percentage amounts.
    If Shares is selected, the broker must input a numeric amount in the
    Number of Shares field.
    If Cash is selected, the broker must then indicate:
        Cash Amount - a numeric input
        Transaction Currency - selected from a drop-down list of
                possible currencies in the following
                order: EUR, USD, CHF, GBP, JPY,

TABLE 9-continued

Fields Required by a Broker for a "Switch" Transaction
Required Field for a Switch Transaction SEK, NOK, CAD, all others appear
in alphabetical order.
Rounding - Either Up, Down, or Full+Fraction
If Percentage is selected, the broker must then input a numeric input
<=100.
Account. Broker inputs or selects from a drop down menu an account for
the transaction. Note that the list of accounts to choose from will vary
based upon the selection under Book Shares described above. The drop-
down menu for the list of accounts for transactions booked at the client
level is ordered by a Client ID. There is a different set of accounts
for each fund manager.
Transaction Type. The broker selects Purchase, Redemption, or Switch.
Full or Partial. The broker is required to select one type. Note, if Nominee
has been selected in the Book Shares field above, the selection Full switch
should not be available.

In an embodiment of the present invention, a broker may optionally enter the fields identified and described in Table 10 in order to complete a "Switch" transaction.

TABLE 10

Optional Fields Input by a Broker for a "Switch" Transaction
Optional Fields for a Switch Transaction Text Field. This field allows Broker to input a reference number for the
transaction or any other information desired.
Allocate. This user module allows the broker to store information as to the
underlying client level details of an order. The broker inputs/selects from a
Client ID and a corresponding number of shares. The system displays each
client's account number.

Figure 19B:
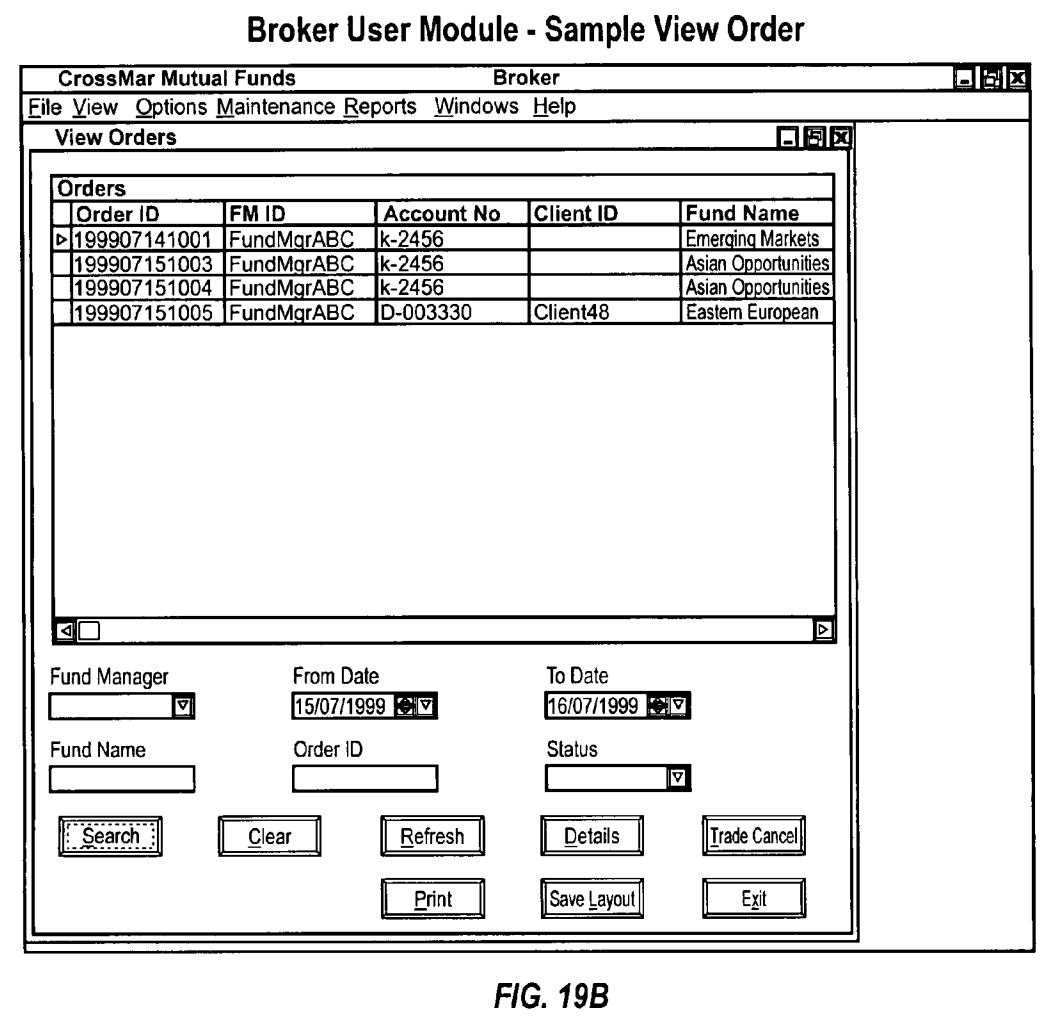

A broker clicks on the "Submit" icon displayed on one of the transaction user modules (FIGS. 10–18) in order to process a transaction order and to bring up the "Broker User Module-View Order," as depicted in FIGS. 19A and 19B. The present invention then performs the following series of required checks regarding the validity of the order information input:
1. All required information has been entered. Note that the only optional fields are the text field and the allocation information.
2. Numeric input has been received in the Number of Shares or Cash Amount fields.
3. Numeric input <=to 100 has been received in the Percentage for a Partial Redemption or Switch.
4. Switches are occurring only between funds from the same Fund Manager and where the initial fee for the Buy fund is <=to the initial fee of the Sell fund.
5. Purchase and Redemption amounts exceed fund minimums.

FIGS. 20A–D and FIG. 21 depict sample error messages that are displayed to a user if any of the order checks described above are invalid. These error messages further prompt the broker to correct the error.

In an embodiment of the present invention, the methods and system also check for identical orders submitted that day. If an identical order is found, the broker is asked to confirm that they still wish to submit the order.

FIGS. 22A–E depict sample order confirmation messages that prompts a broker to confirm an order upon completion and verification of required fields. Once the order has been confirmed, the present invention provides a unique transaction reference number. In addition, the order status is changed from Pending to Order Confirmed and the transaction reference number appears in the Transaction Reference field. The order information is then written into the order attributes database. If the broker decides not to confirm the order, the status is changed to Order Declined.

FIG. 23, entitled "Broker User Module-View Orders," allows a broker to view all orders in the order attributes database. Searches on this data by Fund Manager, Fund Name, Fund ID Number, Status, Transaction Reference Number, and/or Order Date are possible. The broker is able to input a criterion, select from a list of criteria, and/or specify an exact match if required. For a search by Order Date, the broker is able to input a specific date or a range of dates (e.g., older than 10 days). The broker is able to rearrange the columns on this view and save it as a new layout. In addition, all fields in this database can be displayed. FIG. 32, entitled "List of Database Fields in the 'View Order' User Modules" identifies sample data fields, brief descriptions, whether always present, and sample values in the order attributes database.

In another embodiment of the present invention, the broker is able to select and cancel an order from the "View Order" user module. Orders can be canceled on the order date up to a specified order submission time when the status is either Pending or Received FM. To cancel an order, the broker highlights the order, clicks on Trade Cancel, and then confirms cancellation of that particular order. The status of the order is then changed to Cancel if the order was Pending or to ReceivedFMCancel if the status prior to the cancellation was ReceivedFM.

Figure 24:
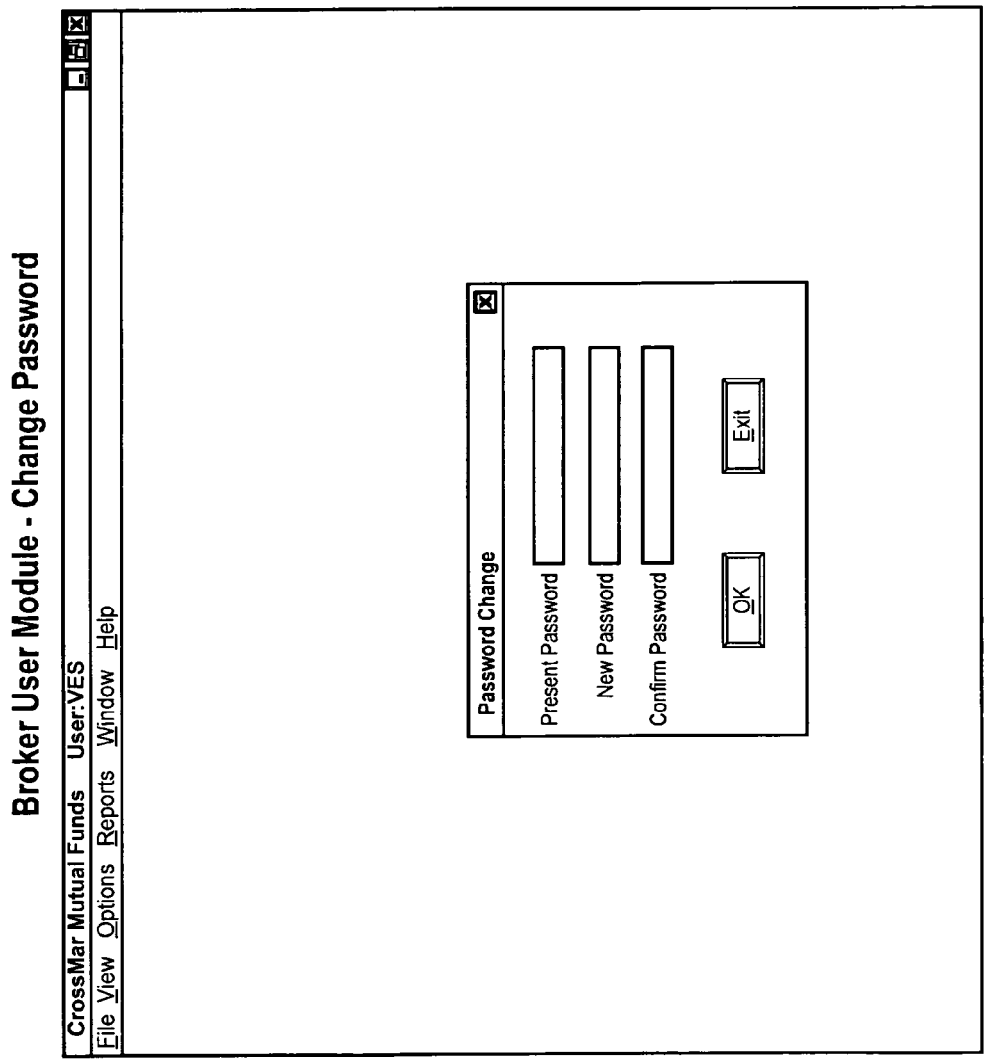

By selecting the Options command and then the Change Password command, the "Change Password" user module as depicted in FIG. 24 is displayed and the broker can change his or her password. To be accepted, the new password must conform with a specified format policy.

By selecting the Options command and then the Set Defaults command, the "Set Defaults" user module as depicted in FIG. 25 is displayed and a user can update the default values for the transactions screens. This function is available to users with administrator privileges. The fields for which default values may be defined include: (1) Book Shares; (2) Basis; (3) Settlement; (4) Account; (5) Transaction Currency; (6) Rounding; (7) Settlement Currency; (8) Dealing Terms; and (9) Type of Shares. The user is able to select a default currency from the list of currencies or is able to have the currency default to that of the fund for which the transaction is being ordered.

By selecting the Options command and then the Add Clients command, the "Add Clients" user module as depicted in FIG. 26 is displayed and a user is able to add a list of client accounts. There are facilities to input and upload this information. This information is used to generate the account listing for accounts booked at the Client level and/or allocate shares for orders booked at the Nominee level. For each client, a user is able to input or modify Client Name, Client ID, Broker Account Number, and Fund Manager Account Numbers (one per fund manager per client).

Fund Manager User Modules

Figure 27:
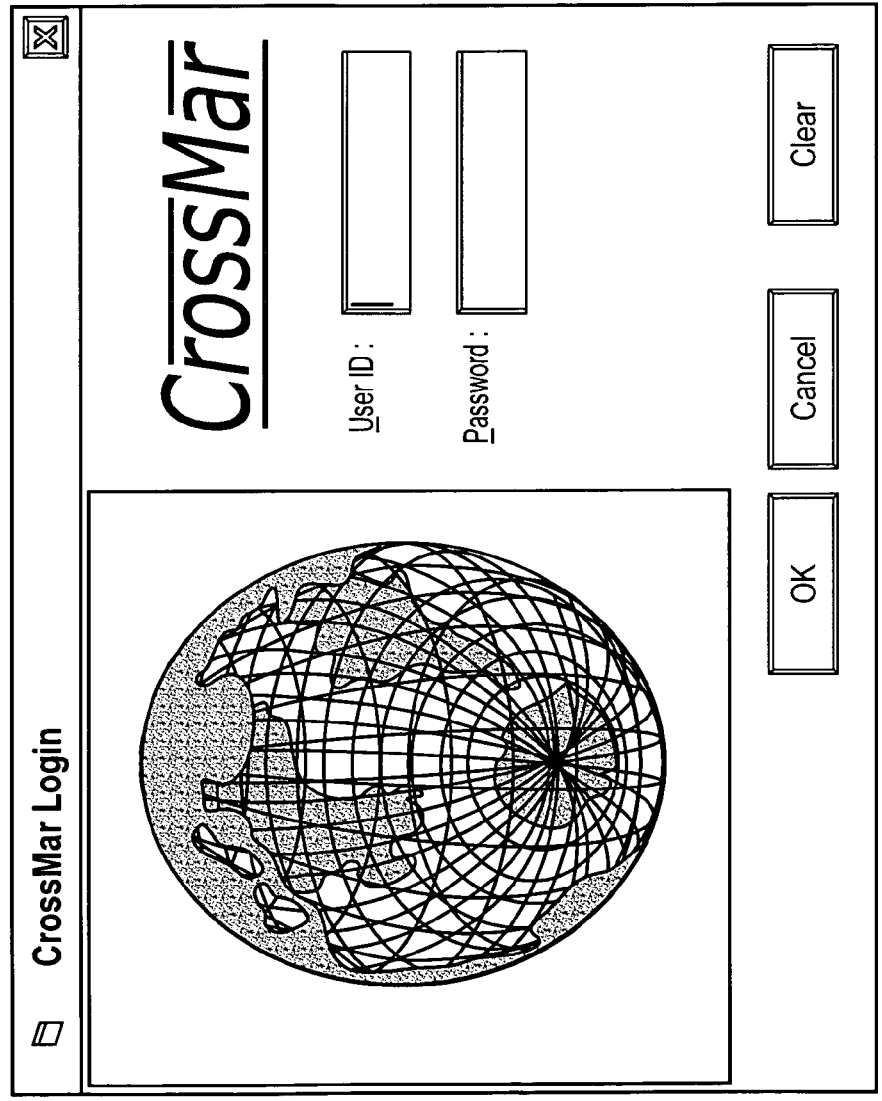

FIG. 27 depicts an embodiment of the "Fund Manager User Module—Initial Log-on" illustrating the logon user module for a fund manager. The fund manager logs onto the system inputting his or her username and password. In an embodiment of the present invention, this is validated by the central process and if invalid, the application terminates. If three inaccurate logons are attempted the account is disabled and a call is necessary to the administrator for reset. All passwords must comply with a secure format policy.

FIGS. 28A and 28B depict embodiments of the "Fund Manager User Module—View Rates" that allow the fund manager to select the commands and sub-commands from the drop-down menu associated with the functions described in Table 11 below.

TABLE 11

Commands and Sub-Commands from Drop Down Menu Bar

| Command | Sub-Command |
| --- | --- |
| File | Print - User reports |
|  | Exit - Exit program |
| View | Rates - Go to Rates User Module |
|  | Transactions - Go to Transaction User Module |
|  | Orders - Go to View Orders User Module |
| Options | Change Password - Go to Change Password User Module |
|  | Set Defaults - Go to Set Defaults User Module |
|  | Add Clients - Go to Add Clients User Module |
| Reports | Orders - Run Orders Report |
| Window | Cascade - Perform this function on any open window |
|  | Tile Horizontally - Perform this function on any open window |
|  | Tile Vertically - Perform this function on any open window |
| Help | Mutual Funds - Bring up Help functionality |
|  | About - Display version and license information |

For each offering, a fund manager is able to view the Fund Manager, Fund Name, Fund ID Number, Currency, Initial Fee %, Redemption Fee %, Type Of Fund, NAV, Bid, Offer, and Pricing Date. There are several possible Fund ID Numbers for each fund. Fund managers can select a view of either ISINs, local codes (e.g., Germany WPKN numbers), or clearing organization codes (e.g., CEDEL). For each view, a fund manager selects either "Global Certificates" or "Registered Shares." The fund manager has the ability to change the view of the type of Fund ID that is displayed. In another embodiment of the present invention, prices are updated daily.

Figure 29B:
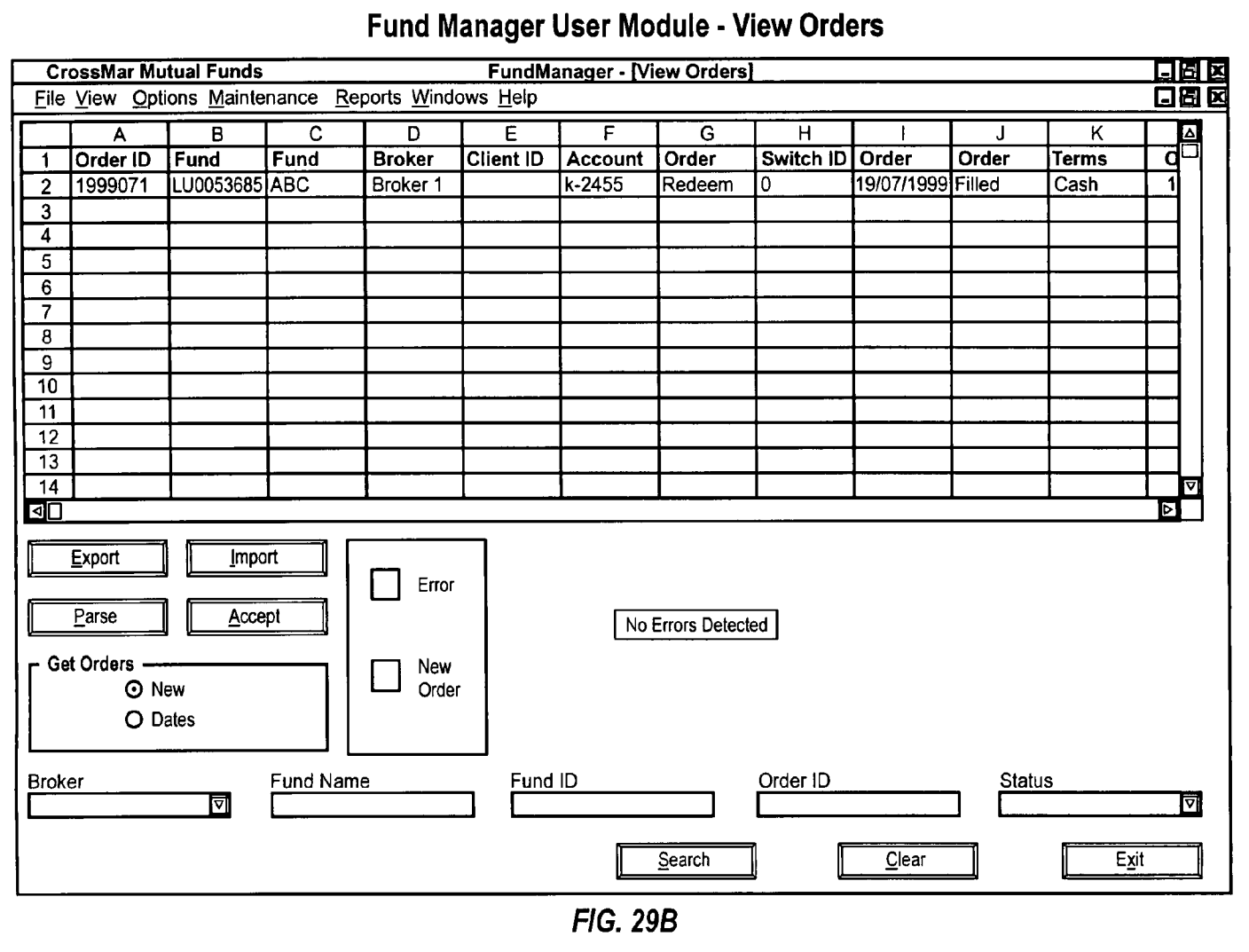

By selecting the View then Orders command, the "Fund Manager User Module—View Orders" as depicted in FIG. 29A or 29B is displayed and the fund manager can view all of his or her orders in the order attributes database. Fund managers can only view an order for his or her fund. All fields in this database are able to be viewed with the exception of Client ID, Broker Client Account Number, Allocation Details, and the Text field. Searches on this data are available by Broker, Fund Name, Fund ID Number, Status, Transaction Reference Number, and/or Order Date can be performed. The fund manager is able to input a criterion, select from a list of criteria, and/or specify an exact match if required. The fund manager is able to rearrange the columns on this view and save it as a new layout. FIG. 32, entitled "List of Database Fields in the 'View Order' User Modules" identifies sample data fields, brief descriptions, whether always present, and sample values for the order attributes database.

From the "Fund Manager User Module—View Orders," order information is electronically transmitted to the fund manager in the format required by that particular fund manager. In an embodiment of the present invention, a fund manager may download a file of pending transactions. The format for the download varies by each fund manager's communications and computer systems. After clicking the Download icon, a fund manager is required to designate where the downloaded file should be stored.

Figure 30A:
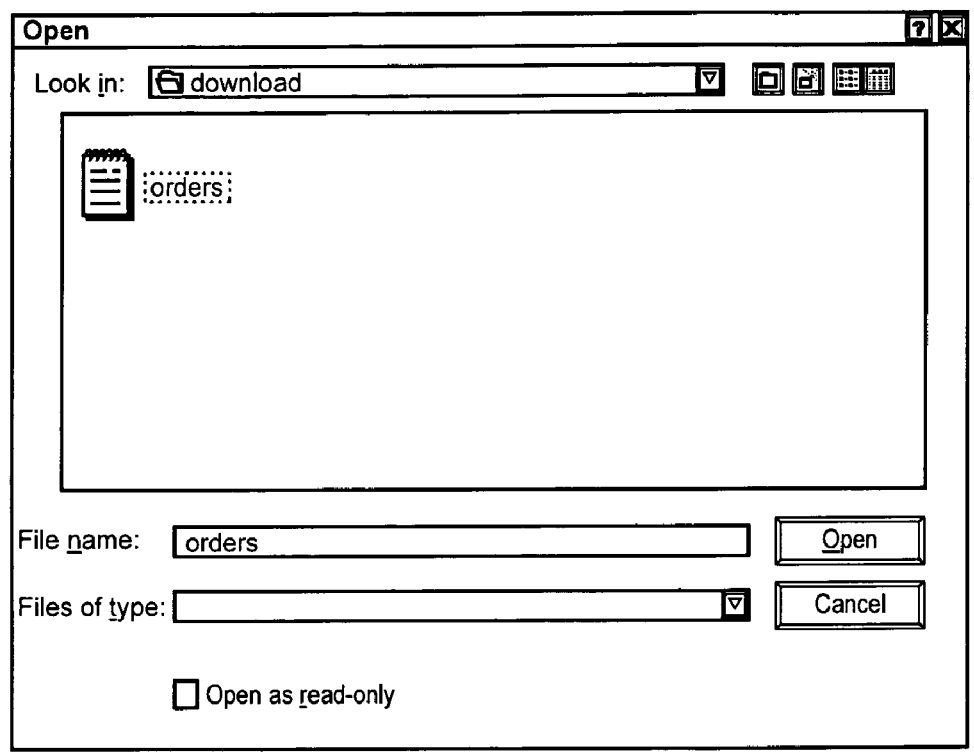
Figure 30B:
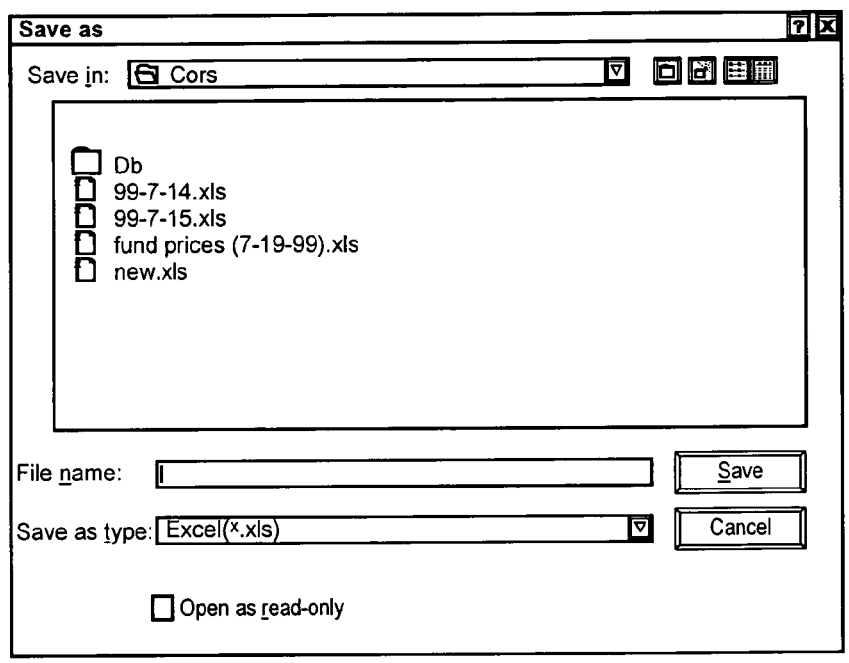

FIG. 30, entitled "Fund Manager User Module—Sample Specification of Location of Download File," illustrates a sample user module to specify the download location of a file. Only "Pending" and "ReceivedFMCancel" orders can be transmitted (via download or otherwise). Once transmitted, the status of orders is automatically updated as follows:

| Status Prior to Transmission | Status Subsequent to Transmission |
| --- | --- |
| Pending | Received FM |
| ReceivedFM | Cancel |

In another embodiment, the order attributes database field "Received Fund Manager" is updated with the date and time that the information is received by the fund manager. The fund manager subsequently provides additional information for each order. The data fields required depend on the fund manager's response to the order (e.g., decisions to fill, reject, or wait for payment) and is set forth in Table 12. Once the order information has been updated, the order status should be changed to either "Filled," "Rejected," or "Non-credit customer; awaiting payment."

TABLE 12

Fields Updated Depending on Fund Manager's Order Decision

| Fund Manager's Decision | Required Field |
| --- | --- |
| For "Filled" Orders | NAV price per share* |
|  | Total Funds due/to be received (Purchase/Redemption) |
|  | Total Shares (Purchase/Redeemed or Switched)* |
|  | FX Rate (if applicable) |
|  | Execution Date/Time |
|  | Commission (if applicable) |
|  | *In the case of a Switch, there are two NAVs and two Total Shares. |
| For "Rejected" Orders | Incomplete settlement instructions |
|  | No credit available |
|  | Redeemed more shares/monetary amounts than owned |
| For "Wait" Orders | No additional information required |

In an embodiment of the present invention, this information could be transmitted in the form of a file upload which is read by the electronic order routing system to automatically update the appropriate fields in the order attributes database. After clicking the Upload button, the fund manager is required to designate where the file to be uploaded is stored. In another embodiment of the present invention, transmission of order information between the electronic order routing system and the fund manager could also be done via messaging following FIX protocol.

Figure 31:
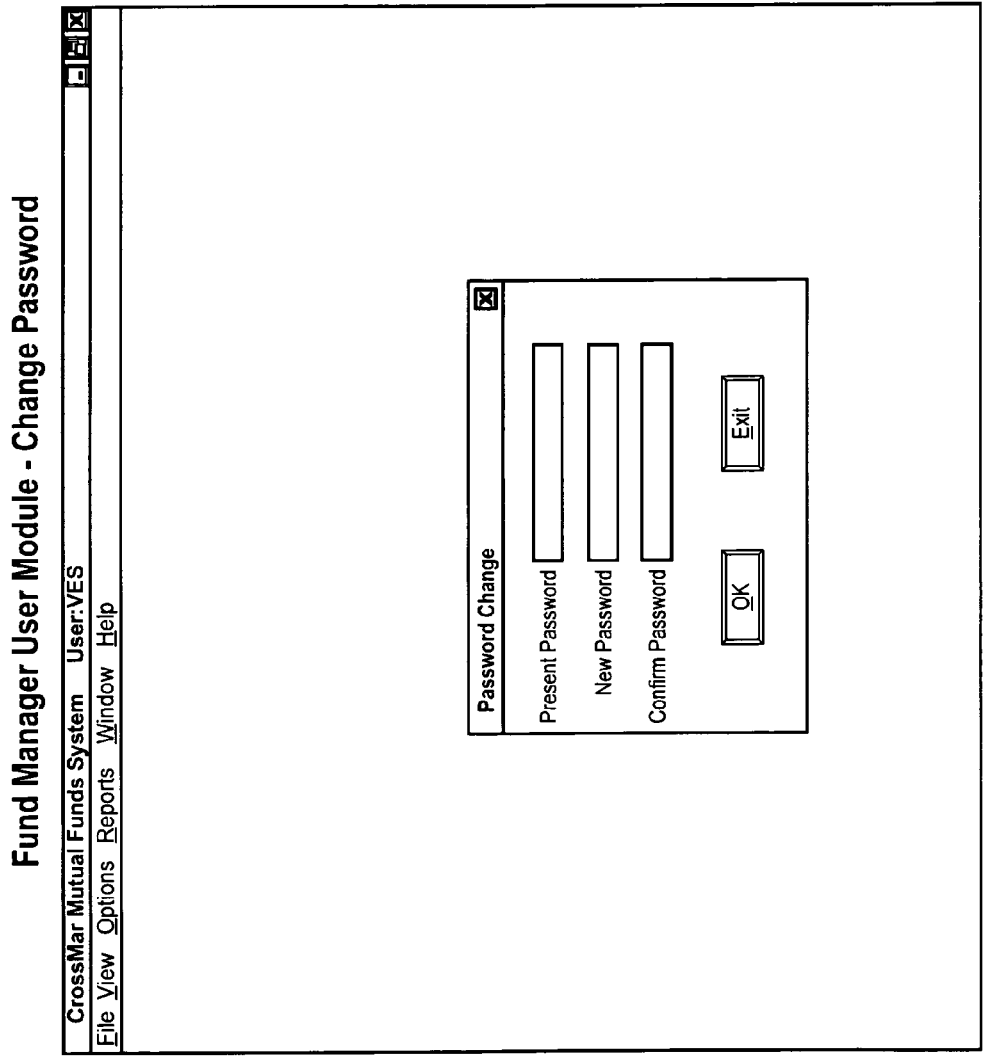

By selecting the Options command and then the Change Password command, the "Change Password" user module as depicted in FIG. 31 is displayed and the fund manager can change his or her password. To be accepted, the new password must conform with a specified format policy.

FIG. 32, entitled "List of Database Fields in the 'View Order' User Modules" identifies sample data fields, brief descriptions, whether always present, and sample values in the orders attributes database in an embodiment of the present invention. Note that the items identified with an asterisk (*) are filled in by the fund manager upon completion or rejection of an order.

Broker Reports

In another embodiment of the present invention, detailed broker reports can be sorted or filtered for orders not yet filled by the fund manager using any combination of the following fields: (1) Transaction Number; (2) Time: Broker Entry; (3) Fund Manager Name; and/or (4) Status. An example is depicted in Table 13 below.

TABLE 13

Example of a Broker Report for Orders Not Yet Filled

| Transaction Reference Number | Fund Manager Name | Fund name | Fund number | Account | Transaction type | Amount | Amount type | Status | Time: Broker Entry | Time: Fund Manager Receipt |
|---|---|---|---|---|---|---|---|---|---|---|
| VES1 | Fidelity | America Equity | 999250 | F9999999 | B | 10000 | Euro | Pending | 14/3/99 13:30 | |
| VES2 | Fidelity | America Equity | 999300 | F10000000 | S | 2000 | Shares | Pending | 14/3/99 13:31 | |
| VES3 | Fidelity | America Equity | 999350 | F10000001 | Sw | −100 | % | Recvd FM | 14/3/99 13:32 | 14/3/99 14:32 |
| | | Europe Equity | 999360 | | Potential Values: B = Buy S = Sell Sw = Switch | 100 | % Potential Values: Currencies = cash amt Shares = share amt % = Full or % partial | Potential Values: Pending Recvd FM Cancel | | Blank if status = Pending or Cancel |

In another embodiment of the present invention, detailed broker reports can be sorted or filtered for filled orders using any combination of the following fields: (1) Transaction Number; (2) Time: Broker Entry; and/or (3) Fund Manager Name. An example is depicted in Table 14 below.

TABLE 14

Example of a Broker Report for Filled Orders

| Transaction Reference Number | Fund Manager Reference Number | Fund Manager Name | Fund name | Fund number | Account | Transaction type | Order Amount | Order Amount Type |
|---|---|---|---|---|---|---|---|---|
| VES1 | Fves1 | Fidelity | America Equ | 999250 | F9999999 | B | 10000 | Euro |
| VES2 | Fves2 | Fidelity | America Equ | 999300 | F10000000 | S | 2000 | Shares |
| VES3 | Fves3 | Fidelity | America Equ | 999350 | F10000001 | Sw | −100 | % |
| | | | Europe Equ | 999360 | | Potential Values: B = Buy S = Sell Sw = Switch | | % Potential Values: Currencies = cash amt Shares = share amt |

| Status | Time: Broker Entry | Time: Fund Manager Receipt | Time: Order Filled | NAV | Total shares | Total amount | Currency |
|---|---|---|---|---|---|---|---|
| Filled | 14/3/99 13:31 | 14/3/99 14:32 | 14/3/99 19:33 | 51 | 196 | 10.000 | USD |
| Filled | 14/3/99 13:31 | 14/3/99 14:32 | 14/3/99 19:33 | 60 | (2.002) | (120.120) | USD |
| Filled | 14/3/99 13:31 | 14/3/99 14:32 | 14/3/99 19:33 | 75 | (333) | (25.000) | USD |
| Potential Values: Pending Recvd FM Cancel | | | | 40 | 688 | 27.500 | Euro |

In another embodiment of the present invention, detailed broker reports can be sorted or filtered for reconciliation of orders for a particular day using any combination of the following fields: (1) Number of Orders filled +; (2) Number of Orders pending +; (3) Number of Orders rejected =; and (4) Number of Orders received prior day (before cut-off).

Fund Manager Reports

In another embodiment of the present invention, detailed fund manager reports can be sorted or filtered for orders not yet filled by the fund manager using any combination of the following fields: (1) Transaction Number; (2) Time: Broker Entry; (3) Broker ID; and/or (4) Status. An example is depicted in Table 15 below.

TABLE 15

Example of a Fund Manager Report for Orders Not Yet Filled

| Transaction Reference Number | Broker ID | Account | Fund name | Fund number | Transaction type | Amount | Amount type | Status | Time: Broker Entry | Time: Fund Manager Receipt |
|---|---|---|---|---|---|---|---|---|---|---|
| VES1 | VES | F9999999 | America Equity | 999250 | B | 10000 | Euro | Pending | 14/3/99 13:30 | |
| VES2 | VES | F10000000 | America Equity | 999300 | S | 2000 | Shares | Pending | 14/3/99 13:31 | |
| VES3 | VES | F10000001 | America Equity | 999350 | Sw | −100 | % | Recvd FM | 14/3/99 13:32 | 14/3/99 14:32 |
| | | | Europe Equity | 999360 | Potential Values: B = Buy S = Sell Sw = Switch | 100 | % Potential Values: Currencies = cash amt Shares = share amt % = Full or % partial | Potential Values: Pending Recvd FM Cancel | | Blank if status = Pending or Cancel |

In another embodiment of the present invention, detailed fund manager reports can be sorted or filtered for filled orders using any combination of the following fields: (1) Transaction Number; (2) Time: Broker Entry; and/or (3) Broker ID. An example is depicted in Table 16 below.

TABLE 16

Example of a Fund Manager Report for Filled Orders

| Transaction Reference Number | Fund Manager Reference Number | Broker ID | Account | Fund name | Fund number | Transaction type | Order Amount |
|---|---|---|---|---|---|---|---|
| VES1 | Fves1 | VES | F9999999 | America Equity | 999250 | B | 10000 |
| VES2 | Fves2 | VES | F10000000 | America Equity | 999300 | S | 2000 |
| VES3 | Fves3 | VES | F10000001 | America Equity | 999350 | Sw | −100 |
| | | | | Europe Equity | 999360 | Potential Values: B = Buy S = Sell Sw = Switch | 100 |

| Order Amount type | Status | Time: Broker Entry | Time: Fund Manager Receipt | Time: Order Filled | NAV | Total shares | Total amount |
|---|---|---|---|---|---|---|---|
| Euro | Filled | 14/3/99 13:31 | 14/3/99 14:32 | 14/3/99 19:33 | 51 | 196 | 10.000 |
| Shares | Filled | 14/3/99 13:31 | 14/3/99 14:32 | 14/3/99 19:33 | 60 | (2.002) | (120.120) |
| % | Filled | 14/3/99 13:31 | 14/3/99 14:32 | 14/3/99 19:33 | 75 | (333) | (25.000) |
| % Potential Values: Currencies = cash amt Shares = share amt % = Full or % partial | Potential Values: Pending Recvd FM Cancel | | | | 40 | 688 | 27.500 |

In another embodiment of the present invention, detailed fund manager reports can be sorted or filtered for reconciliation of orders for a particular day using any combination of the following fields: (1) Number of Orders filled +; (2) Number of Orders pending +; (3) Number of Orders rejected =; and (4) Number of Orders received prior day (before cut-off).

The foregoing description, associated figures, and embodiments detail only illustrative examples of the environment in which the invention can be used and are not intended to be limiting. For instance, the user modules shown in FIGS. 8–31 are by way of example only. In addition, attributes can be constantly updated and additional fields can be added by authorized users and/or authorized financial institutions (e.g., financial service providers, businesses). Furthermore, the programming languages, software platforms, operating systems, hardware components, and other technology mentioned in the foregoing description are by way of example only, and the present invention may always be enhanced to incorporate the most advanced available technology. Variations and modifications of the present invention is apparent to one skilled in the art, and the above disclosure is intended to cover all such modifications and equivalents.

What is claimed is:

1. A method of electronic order routing using a global communications network, comprising the steps of:

receiving financial parameters for available financial instruments from each of a plurality of fund managers at respective fund manager terminals via the global communications network;

allowing each fund manager to designate a single predetermined daily cutoff time for all of the fund manager's financial parameters;

allowing a plurality of brokers at respective broker terminals to access the financial parameters associated with the available financial instruments via the global communications network;

receiving transactional data from one of the brokers at one of the broker terminals, wherein said transactional data comprises user account data and user instructional data for a financial instrument;

authenticating said transactional data;

relating the transactional data to at least one of the available financial instruments via a relational database storing order details for each broker and fund details for each fund manager;

retrieving financial parameters received from at least one of the fund managers for the available financial instrument for said transactional data;

calculating a real-time market value for said available financial instrument;

managing said transactional data;

storing said transactional data; and using said transactional data to complete an order for said financial instrument according to the retrieved financial parameters, if the order is completed before the predetermined daily cutoff time.

2. The method of claim 1, wherein managing said transactional data comprises:

translating said transactional data into a user specified language and a user specified currency;

communicating said transactional data among multiple users to complete said order for said financial instrument;

editing said transactional data;

updating said transactional data;

monitoring said transactional data;

maintaining said transactional data;

notifying a user that said order for said financial instrument is complete; and generating reports associated with said transactional data.

3. The method of claim 1, further comprising:

transmitting said transactional data from a broker to a fund manager.

4. The method of claim 1, further comprising:

transmitting said transactional data from said fund manager to said broker.

5. The method of claim 1, further comprising:

generating a payment message, wherein said payment message sets forth settlement instructions.

6. The method of claim 1, further comprising:

translating said transactional data into any language selected by a user; and translating said user instructional data and said financial parameters into a selected currency to pay for said order.

7. The method of claim 1, further comprising:

transferring commission information; and verifying commission information.

8. The method of claim 1, wherein said order comprises one of an order to purchase, an order to switch, or an order to redeem said financial instrument.

9. The method of claim 8, wherein said order to switch comprises one of an order to purchase said financial instrument, or an order to sell said financial instrument.

10. The method of claim 9, wherein said order to switch further comprises portfolio switching from a first fund of many funds to a second fund of many funds.

11. The method of claim 1, further comprising:

transmitting incremental marketing and valuation data associated with said financial instrument.

12. The method of claim 1, further comprising:

incorporating data parameters for small intermediaries to complete an order for said financial instrument.

13. The method of claim 1, wherein said financial parameters comprise real-time world-wide market values.

14. A system for electronic order routing using a global communications network, comprising:

a plurality of fund manager terminals each displaying a graphical user interface adapted for receiving financial parameters for available financial instruments from each of a plurality of fund managers at respective ones of the fund manager terminals via the global communications network;

wherein the graphical user interface is further adapted for allowing each fund manager to designate a single predetermined daily cutoff time for all of the fund manager's financial parameters;

a plurality of broker terminals each displaying a graphical user interface adapted for allowing a each of a plurality of brokers at respective ones of the broker terminals to access the pricing parameters associated with the available financial instruments via the global communications network;

wherein the graphical user interface displayed on each of the broker terminals is further adapted for receiving transactional data from one of the brokers at one of the broker terminals, and wherein said transactional data comprises user account data and user instructional data for a financial instrument;

means for authenticating said transactional data;

a relational database storing order details for each broker and fund details for each fund manager and adapted for relating the transactional data to at least one of the available financial instruments;

means for retrieving financial parameters received from at least one of the fund managers for the available financial instrument for said transactional data;

means for calculating a real-time market value for said available financial instrument;

means for managing said transactional data;

means for storing said transactional data; and means for using said transactional data to complete an order for said financial instrument according to the retrieved financial parameters, if the order is completed before the predetermined daily cutoff time.

15. The system of claim 14, wherein the means for managing said transactional data comprises:

means for translating said transactional data into a user specified language and a user specified currency;

means for communicating said transactional data among multiple users to complete said order for said financial instrument;

means for editing said transactional data;

means for updating said transactional data;

means for monitoring said transactional data;

means for maintaining said transactional data;

means for notifying a user that said order for said financial instrument is complete; and means for generating reports associated with said transactional data.

16. The system of claim 14, further comprising:
means for transmitting said transactional data from a broker to a fund manager.

17. The system of claim 14, further comprising:
means for transmitting said transactional data from said fund manager to said broker.

18. The system of claim 14, further comprising:
means for generating a payment message, wherein said payment message sets forth settlement instructions.

19. The system of claim 14, further comprising:
means for translating said transactional data into any language selected by a user; and
translating said user instructional data and said financial parameters into a selected currency to pay for said order.

20. The system of claim 14, further comprising:
means for transferring commission information; and
means for verifying commission information.

21. The system of claim 14, wherein said order comprises one of an order to purchase, an order to switch, or an order to redeem said financial instrument.

22. The system of claim 21, wherein said order to switch comprises one of an order to purchase said financial instrument, or an order to sell said financial instrument.

23. The system of claim 22, wherein said order to switch further comprises portfolio switching from a first fund of many funds to a second fund of many funds.

24. The system of claim 14, further comprising:
means for transmitting incremental marketing and valuation data associated with said financial instrument.

25. The system of claim 14, further comprising:
means for incorporating data parameters for small intermediaries to complete an order for said financial instrument.

26. The system of claim 14, wherein said financial parameters comprise real-time world-wide market values.

27. An automated method for electronic order routing having a plurality of computer executable steps, comprising:
displaying a remote interactive user interface, wherein said interface provides means for displaying one or more user modules and for inputting one or more transactional attributes, said transactional attributes comprising at least one of the following:
user account data,
purchase instructions,
redemption instructions,
switching instructions,
financial limitations,
order attributes,
confirmation instructions,
settlement instructions,
financial parameters for available financial instruments from each of a plurality of fund managers, and
a designation by each fund manager of a single predetermined daily cutoff time for all of the fund manager's financial parameters;
storing said transactional attributes in a secure communications system consisting at least in part of a relational database storing order details for each broker and fund details for each of a plurality of fund managers and adapted for relating the transactional attributes to at least one of the available financial instruments;
selectively retrieving and routing said transactional attributes to a user associated with a financial transaction;
allowing said user to access said transactional attributes to determine a financial instrument order outcome;
storing said financial instrument order outcome in said secure communications system;
transmitting said financial instrument order outcome to said user at a remote interface to complete a transaction for said financial instrument order outcome according to the retrieved transactional attributes, if the transaction is completed before the predetermined daily cutoff time.

28. The method of claim 27, wherein said secure communications system further comprises a financial institution's communications system.

29. An automated system for electronic order routing having a plurality of computer executable steps, comprising:
means for displaying a remote interactive user interface, wherein said interface provides means for displaying one or more user modules and for inputting one or more transactional attributes, said transactional attributes comprising at least one of the following:
user account data,
purchase instructions,
redemption instructions,
switching instructions,
financial limitations,
order attributes,
confirmation instructions,
settlement instructions,
financial parameters for available financial instruments from each of a plurality of fund managers, and
a designation by each fund manager of a single predetermined daily cutoff time for all of the fund manager's financial parameters;
means for storing said transactional attributes in a secure communications system consisting at least in part of a relational database storing order details for each broker and fund details for each of a plurality of fund managers and adapted for relating the transactional attributes to at least one of the available financial instruments;
means for selectively retrieving and routing said transactional attributes to a user associated with a financial transaction;
means for allowing said user to access said transactional attributes to determine a financial instrument order outcome;
means for storing said financial instrument order outcome in said secure communications system; and
means for transmitting said financial instrument order outcome to said user at a remote interface to complete a transaction for said financial instrument order outcome according to the retrieved transactional attributes, if the transaction is completed before the predetermined daily cutoff time.

30. The system of claim 29, wherein said secure communications system further comprises a financial institution's communications system.

31. The method of claim 1, wherein using said transactional data to complete an order for said financial instrument further comprises:
receiving a message by a host server from said one of the fund managers at the fund manager terminal via the global communications network requesting a download of the order;

packaging information about the order by the host server and returning the order information to the fund manager at the fund manager terminal via the global communications network;

allowing the fund manager at the fund manager terminal options for one of filling the order, rejecting the order, or holding the order for further instructions;

if the fund manager fills the order, receiving an upload of information about the filled order by the host server from the fund manager at the fund manager terminal via the global communications network; and sending the information about the filled order to said one of the brokers at the broker terminal by the host server via the global communications network.

32. A method of electronic order routing using a global communications network, comprising the steps of:

allowing a plurality of fund managers at respective fund manager terminals to import pricing parameters for available financial instruments in a spreadsheet format to a host server via the global communications network;

allowing each fund manager to designate a single predetermined daily cutoff time for all of the fund manager's pricing parameters;

allowing a plurality of brokers at respective broker terminals to access the pricing parameters associated with the available financial instruments on the host sever via the global communications network;

receiving an order comprising broker account data and broker instructional data for one of the financial instruments by the host server from one of the brokers at one of the broker terminals via the global communications network;

relating the order for the financial instrument to at least one of the available financial instruments via a relational database storing order details for each broker and fund details for each fund manager;

receiving a message by the host server from one of the fund managers at one of the fund manager terminals via the global communications network requesting a download of the order;

if said one of the fund managers fills the order before the predetermined daily cutoff time, receiving an upload of information about the filled order by the host server from said one of the fund managers at said one of the fund manager terminals via the global communications network; and sending the information about the filled order to said one of the brokers at said one of the broker terminals by the host server via the global communications network.

33. The method of claim 32, wherein receiving the order further comprises:

retrieving pricing parameters for the order by the host server via an indicative price feed coupled to the host server;

calculating a real-time market value for the financial instrument by the host server; and storing the order on a database by the host server.

34. The method of claim 33, wherein receiving the order further comprises:

executing a stored procedure by the host server on the database to select the requested order;

packaging information about the order by the host server and returning the order information to said one of the fund managers at said one of the fund manager terminals via the global communications network; and allowing said one of the fund managers at said one of the fund manager terminals options for one of filling the order, rejecting the order, or holding the order for further instructions.

* * * * *